US009494947B2

(12) United States Patent
Hirata et al.

(10) Patent No.: US 9,494,947 B2
(45) Date of Patent: Nov. 15, 2016

(54) PRESSURE TYPE FLOW CONTROL SYSTEM WITH FLOW MONITORING

(71) Applicant: FUJIKIN INCORPORATED, Osaka (JP)

(72) Inventors: Kaoru Hirata, Osaka (JP); Ryousuke Dohi, Osaka (JP); Kouji Nishino, Osaka (JP); Nobukazu Ikeda, Osaka (JP); Katsuyuki Sugita, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 174 days.

(21) Appl. No.: 14/075,740

(22) Filed: Nov. 8, 2013

(65) Prior Publication Data

US 2014/0182692 A1    Jul. 3, 2014

Related U.S. Application Data

(63) Continuation-in-part of application No. PCT/JP2012/002395, filed on Apr. 5, 2012.

(30) Foreign Application Priority Data

May 10, 2011 (JP) ................................ 2011-105265

(51) Int. Cl.
*G05D 7/06* (2006.01)
*G01F 25/00* (2006.01)
(Continued)

(52) U.S. Cl.
CPC .............. *G05D 7/0623* (2013.01); *G01F 1/36* (2013.01); *G01F 1/363* (2013.01); *G01F 1/50* (2013.01);
(Continued)

(58) Field of Classification Search
CPC ............. G05D 7/0617; G05D 7/0623; G05D 7/0635; G01F 1/36; G01F 1/363; G01F 1/50; G01F 1/6842; G01F 1/6965; G01F 5/00;
G01F 15/005; G01F 25/0007; Y10T 137/7759; Y10T 137/7761
USPC ................................ 137/486, 487.5
See application file for complete search history.

(56) References Cited

U.S. PATENT DOCUMENTS 4,622,988 A    11/1986    Takimoto et al.
4,787,254 A *  11/1988    Duckworth ............... G01F 1/42
73/861.62
(Continued)

FOREIGN PATENT DOCUMENTS

JP    02-255595 A    10/1990
JP    5-102024 A    4/1993
(Continued)

OTHER PUBLICATIONS

Final Office Action issued in co-pending related U.S. Appl. No. 14/150,263 on Nov. 17, 2015.
(Continued)

*Primary Examiner* — William McCalister
(74) *Attorney, Agent, or Firm* — Griffin and Szipl PC

(57) ABSTRACT

A pressure type flow control system with flow monitoring includes an inlet side passage, a control valve comprising a pressure-type flow control unit connected downstream of the inlet side passage, a thermal-type flow sensor connected downstream of the control valve, an orifice installed on a fluid passage connected downstream of the thermal-type flow sensor, a temperature sensor provided near the fluid passage between the control valve and orifice, a pressure sensor provided for the fluid passage between the control valve and orifice, an outlet side passage connected to the orifice, and a control unit comprising a pressure-type flow rate arithmetic and control unit to which a pressure signal from the pressure sensor and a temperature signal from the temperature sensor are input, and which computes a flow rate value of fluid flowing through the orifice, and outputs a control signal to a valve drive unit of the control valve.

6 Claims, 26 Drawing Sheets

(51) Int. Cl.
G01F 1/36 (2006.01)
G01F 1/50 (2006.01)
G01F 1/684 (2006.01)
G01F 1/696 (2006.01)
G01F 5/00 (2006.01)
G01F 15/00 (2006.01)

(52) U.S. Cl.
CPC ........... *G01F 1/6842* (2013.01); *G01F 1/6965* (2013.01); *G01F 5/00* (2013.01); *G01F 15/005* (2013.01); *G01F 25/0007* (2013.01); *G05D 7/0617* (2013.01); *G05D 7/0635* (2013.01); *Y10T 137/0368* (2015.04); *Y10T 137/7759* (2015.04); *Y10T 137/7761* (2015.04)

(56) References Cited

U.S. PATENT DOCUMENTS

| | | | |
|---|---|---|---|
| 5,451,258 | A | 9/1995 | Hillman et al. |
| 5,669,408 | A | 9/1997 | Nishino et al. |
| 5,791,369 | A | 8/1998 | Nishino et al. |
| 5,816,285 | A | 10/1998 | Ohmi et al. |
| 5,865,205 | A * | 2/1999 | Wilmer ............... G05D 7/0635 137/2 |
| 6,119,710 | A * | 9/2000 | Brown ................. G01F 1/50 137/14 |
| 6,205,409 | B1* | 3/2001 | Zvonar ................ G01F 25/00 137/486 |
| 6,210,482 | B1 | 4/2001 | Kitayama et al. |
| 6,314,992 | B1 | 11/2001 | Ohmi et al. |
| 6,539,968 | B1* | 4/2003 | White ................. G05D 7/0635 137/10 |
| 6,698,728 | B1 | 3/2004 | Ravetz et al. |
| 7,833,353 | B2 | 11/2010 | Furukawahara et al. |
| 2001/0013363 | A1 | 8/2001 | Kitayama et al. |
| 2002/0174898 | A1* | 11/2002 | Lowery ............... G05D 7/0635 137/487.5 |
| 2004/0007180 | A1 | 1/2004 | Yamasaki et al. |
| 2004/0144178 | A1* | 7/2004 | Ohmi ..................... G01D 3/022 73/708 |
| 2005/0173003 | A1* | 8/2005 | Laverdiere ......... G05D 16/2013 137/487.5 |
| 2005/0221004 | A1 | 10/2005 | Kilpela et al. |
| 2006/0008328 | A1* | 1/2006 | Morgan ............... G05D 7/0647 406/10 |
| 2007/0254093 | A1 | 11/2007 | Nijhawan et al. |
| 2008/0009978 | A1* | 1/2008 | Smirnov ............. G05D 7/0635 700/282 |
| 2008/0220164 | A1 | 9/2008 | Bauch et al. |
| 2009/0095068 | A1* | 4/2009 | Redemann ............ G01F 1/6842 73/202 |
| 2009/0214779 | A1 | 8/2009 | Sarigiannis et al. |
| 2009/0326719 | A1 | 12/2009 | Nagase et al. |
| 2010/0012026 | A1 | 1/2010 | Hirata et al. |
| 2010/0108154 | A1 | 5/2010 | Minami et al. |
| 2010/0139775 | A1* | 6/2010 | Ohmi ................... G05D 7/0635 137/12 |
| 2010/0178423 | A1 | 7/2010 | Shimizu et al. |
| 2010/0192854 | A1 | 8/2010 | Nishino et al. |
| 2010/0304567 | A1 | 12/2010 | Sakai et al. |
| 2011/0100483 | A1 | 5/2011 | Nagata et al. |
| 2011/0108126 | A1* | 5/2011 | Monkowski ......... G05D 7/0635 137/12 |
| 2011/0265895 | A1* | 11/2011 | Okabe .................... C23C 16/00 137/561 A |

FOREIGN PATENT DOCUMENTS

| | | |
|---|---|---|
| JP | 06-104155 A | 4/1994 |
| JP | 07-118862 A | 5/1995 |
| JP | 2000-066732 A | 3/2000 |
| JP | 2000-282242 A | 10/2000 |
| JP | 2000-323464 A | 11/2000 |
| JP | 2001-313288 A | 11/2001 |
| JP | 3291161 B2 | 6/2002 |
| JP | 2002-543589 A | 12/2002 |
| JP | 2003-013233 A | 1/2003 |
| JP | 2003-286573 A | 10/2003 |
| JP | 2003-323217 A | 11/2003 |
| JP | 2004-091917 A | 3/2004 |
| JP | 2004-246826 A | 9/2004 |
| JP | 2004-256864 A | 9/2004 |
| JP | 2005-149075 A | 6/2005 |
| JP | 2006-038832 A | 2/2006 |
| JP | 2007-095042 A | 4/2007 |
| JP | 2007-250803 A | 9/2007 |
| JP | 2008-010510 A | 1/2008 |
| JP | 4137666 B2 | 6/2008 |
| JP | 2009-059871 A | 3/2009 |
| JP | 2009-076807 A | 4/2009 |
| JP | 2009-226408 A | 10/2009 |
| JP | 2009-252760 A | 10/2009 |
| JP | 2010-153741 A | 7/2010 |
| JP | 2011-006782 A | 1/2011 |
| JP | 4605790 B2 | 1/2011 |
| JP | 2011-137235 A | 7/2011 |
| JP | 2001-258184 A | 9/2011 |
| WO | 00/65649 A1 | 11/2000 |
| WO | 01/42539 A1 | 6/2001 |
| WO | 2009/122646 A1 | 10/2009 |

OTHER PUBLICATIONS

International Search Report issued in application PCT/JP2012/001117, completed Apr. 2, 2012 and mailed Apr. 17, 2012.
http://www.massflow-online.com/faqs/what-do-lnmin-lsmin-slm-and-sccm-stand-for/ (2012)(downloaded Sep. 11, 2013).
English translation of the International Preliminary Report on Patentability issued in application PCT/JP2012/001117, mailed Apr. 17, 2012.
International Search Report issued in application PCT/JP2012/002395 completed Apr. 20, 2012 and mailed May 1, 2012.
English translation of the International Preliminary Report on Patentability issued in application PCT/JP2012/002395, on Nov. 13, 2013.
International Search Report issued in application PCT/JP2012/002394 completed Apr. 20, 2012 and mailed May 1, 2012.
English translation of the International Preliminary Report on Patentability issued in application PCT/JP2012/002394, on Nov. 13, 2013.
International Search Report issued in application PCT/JP2012/002832, completed Sep. 21, 2012 and mailed Oct. 2, 2012.
English translation of the International Preliminary Report on Patentability issued in application PCT/JP2012/002832 on Jan. 14, 2014.
"Standard Cubic Centimeters Per Minute," at http://www.all-acronyms.com/SCCMstandard_cubic_centimeters_per_minute/213202 (downloaded Nov. 14, 2013).
"Tetraethyl Orthosilicate" (Air Products and Chemicals, Inc. 2012).
International Search Report issued in application PCT/JP2012/003783, completed Jul. 31, 2012 and mailed Aug. 7, 2012.
English translation of the International Preliminary Report on Patentability issued in application PCT/JP2012/003783, on Feb. 4, 2014.
International Search Report issued in application PCT/JP2012/004559, completed Aug. 6, 2012 and mailed Aug. 14, 2012.
Office Action issued in co-pending related U.S. Appl. No. 14/150,263 on Jun. 16, 2015.
Office Action issued in co-pending related U.S. Appl. No. 14/065,078 on Aug. 27, 2015.
Office Action issued in co-pending related U.S. Appl. No. 14/170,953 on May 13, 2016.
Office action issued Sep. 6, 2016 in co-pending related U.S. Appl. No. 14/170,953.
Office action issued Jul. 27, 2016 in co-pending related U.S. Appl. No. 14/343,226.

* cited by examiner

Prior Art

Prior Art

FIG. 25
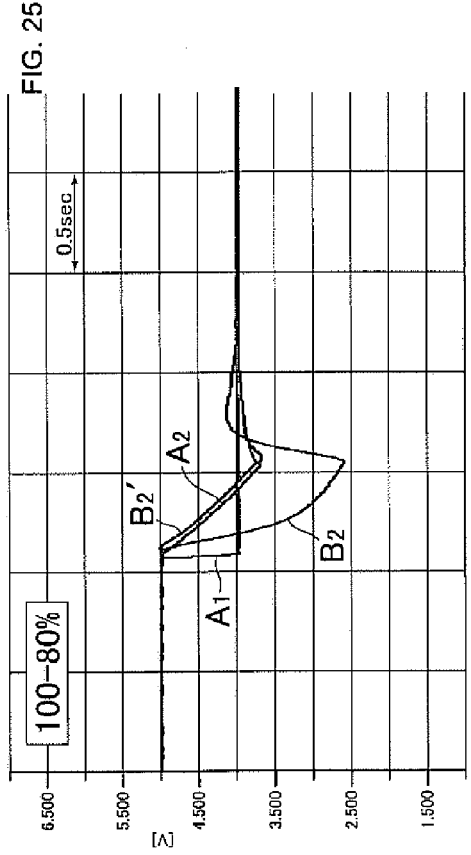
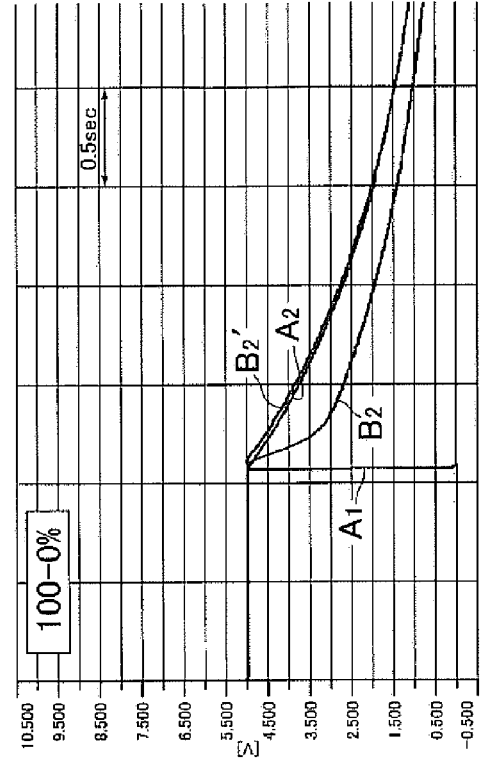
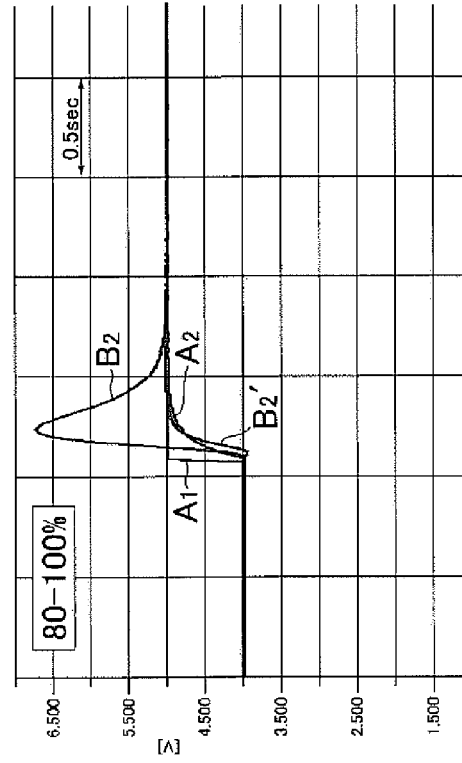
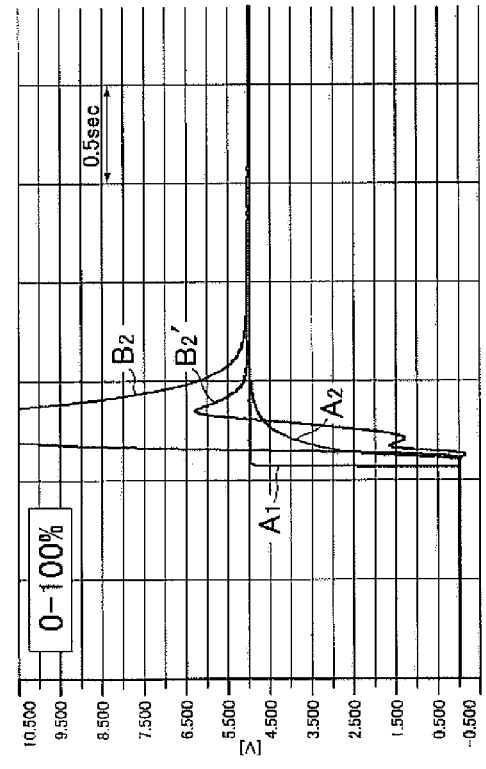

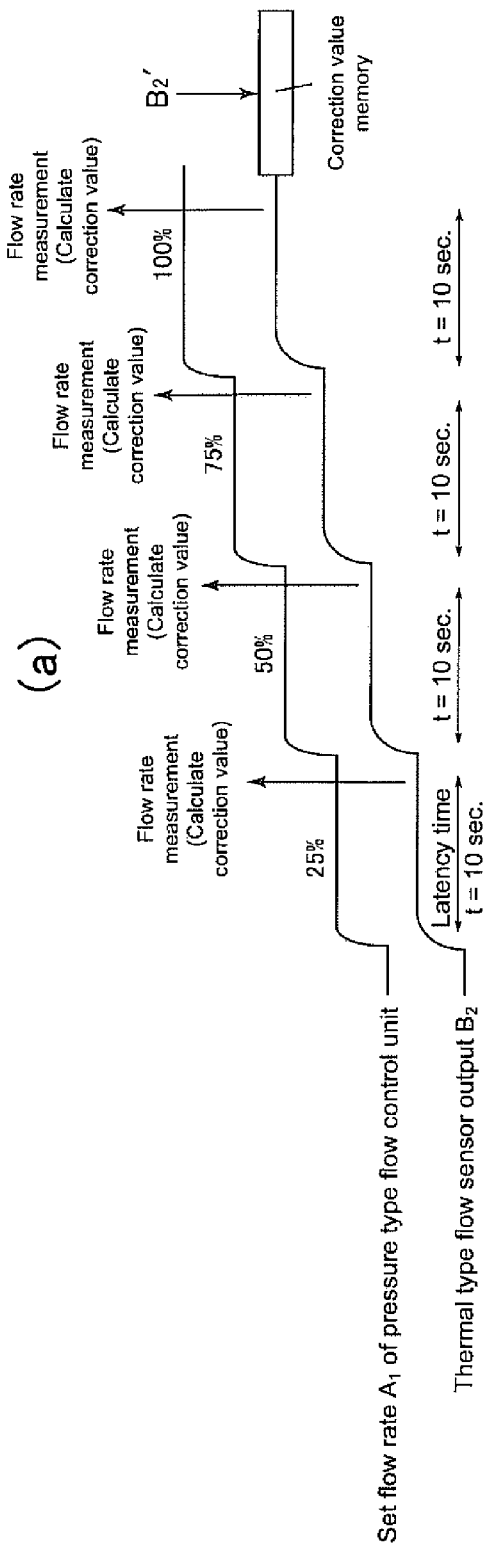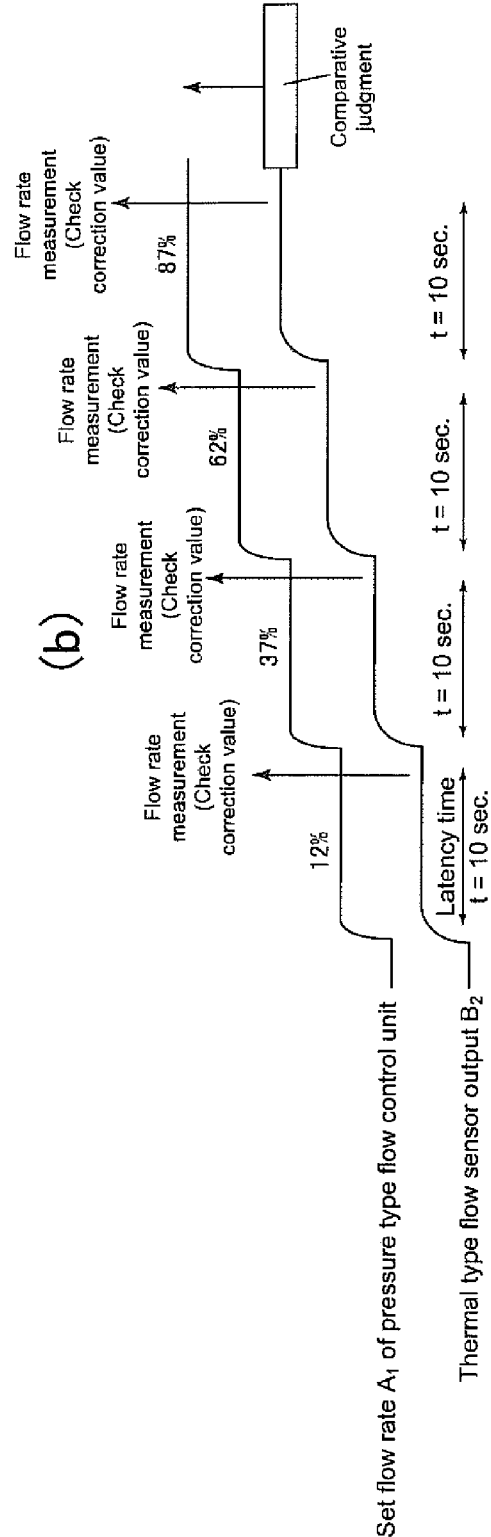
FIG. 30

PRESSURE TYPE FLOW CONTROL SYSTEM WITH FLOW MONITORING

This is a Continuation-in-Part application in the United States of International Patent Application No. PCT/JP2012/002395 filed Apr. 5, 2012, which claims priority on Japanese Patent Application No. 2011-105265, filed May 10, 2011. The entire disclosures of the above patent applications are hereby incorporated by reference.

FIELD OF THE INVENTION

The present invention relates to an improvement in a pressure type flow control system and, in particular, to a pressure type flow control system with flow monitoring that is capable of monitoring a controlled flow rate of the pressure type flow control system in real-time operation by organically combining a thermal type mass flow sensor with the pressure type flow control system using an orifice, and improving the response characteristics of flow control and the flow control accuracy.

BACKGROUND OF THE INVENTION

Description of the Related Art

Conventionally, in a gas supply apparatus for a semiconductor control device, a pressure type flow control system FCS using an orifice has been widely used. This pressure type flow control system FCS is, as shown in FIG. 16, composed of a control valve CV, a temperature detector T, a pressure detector P, an orifice OL, an arithmetic and control unit CD, and the like, and the arithmetic and control unit CD is composed of a temperature correction/flow rate arithmetic circuit CDa, a comparison circuit CDb, an input-output circuit CDc, an output circuit CDd, and the like.

Detection values from the pressure detector P and the temperature detector T are converted into digital signals, to be input to the temperature correction/flow rate arithmetic circuit CDa, and a temperature correction and a flow rate computation are carried out therein, and a computed flow rate value Qt is input to the comparison circuit CDb. Furthermore, an input signal Qs is input as a set flow rate is from a terminal "In," to be converted into a digital value in the input-output circuit CDc, and the digital value is thereafter input to the comparison circuit CDb, to be compared with the computed flow rate value Qt from the temperature correction/flow rate arithmetic circuit CDa. Then, in the case where the set flow rate input signal Qs is higher than the computed flow rate value Qt, a control signal Pd is output to a drive unit of the control valve CV, and the control valve CV is driven in the opening direction, and is driven in the valve-opening direction until a difference (Qs-Qt) between the set flow rate input signal Qs and the computed flow rate value Qt becomes zero.

The pressure type flow control system FCS itself is publicly known as described above. Meanwhile, the pressure type flow control system FCS is excellently characterized by that, in the case where the relationship that $P_1/P_2$ is greater than or equal to about 2 (i.e., so-called critical expansion conditions) is maintained between the downstream side pressure $P_2$ of the orifice OL (i.e., the pressure $P_2$ on the side of the process chamber) and the upstream side pressure $P_1$ of the orifice OL (i.e., the pressure $P_1$ on the outlet side of the control valve CV), the flow rate Q of the gas Go flowing through the orifice OL becomes $Q=KP_1$ (however K is a constant). Thus, it is possible to highly accurately control the flow rate Q by controlling the pressure $P_1$, and the controlled flow rate value hardly changes even when the pressure of the gas Go on the upstream side of the control valve CV is greatly changed.

However, because the conventional pressure type flow control system FCS uses an orifice OL with a minute hole diameter, there may be a risk that the hole diameter of the orifice OL varies over time. As a result, there is a problem that a difference is caused between a controlled flow rate value by the pressure type flow control system FCS and a real flow rate of the gas Go actually flowing through it. Consequently, it is necessary to frequently carry out so-called "flow monitoring" in order to detect the difference, which highly influences the operating characteristics of semiconductor manufacturing equipment and the quality of manufactured semiconductors.

Therefore, conventionally, a flow control system that is capable of simply monitoring whether or not flow control is appropriately performed in real time has been developed in the fields of thermal type mass flow control systems and pressure type flow control systems. For example, FIG. 17 and FIG. 18 show one example thereof, and this mass flow control system (mass flow controller) 20 is composed of a flow passage 23, a first pressure sensor 27a for detecting pressure on the upstream side, an opening/closing control valve 24, a thermal type mass flow sensor 25 that is installed on the downstream side of the opening/closing control valve 24, a second pressure sensor 27b that is installed on the downstream side of the thermal type mass flow sensor 25, a throttle unit (sonic nozzle) 26 that is installed on the downstream side of the second pressure sensor 27b, an arithmetic and control unit 28a, an input-output circuit 28b, and the like.

The thermal type mass flow sensor 25 has a rectifier body 25a that is inserted into the flow passage 23, a branched flow passage 25b that is branched from the flow passage 23 so as to have only a flow rate of F/A, and a sensor main body 25c that is installed on the branched flow passage 25b, and outputs a flow rate signal Sf denoting a total flow rate F. Furthermore, the throttle unit 26 is a sonic nozzle that flows a fluid at a flow rate corresponding to the pressure on the primary side when a pressure difference between those on the primary side and the secondary side is higher than or equal to a predetermined value. In addition, in FIG. 17 and FIG. 18, reference symbols Spa and Spb denote pressure signals, reference symbols Pa and Pb denote pressures, reference symbol F is a flow rate, reference symbol Sf denotes a flow rate signal, and reference symbol Cp denotes a valve opening degree control signal.

The arithmetic and control unit 28a feeds back the pressure signals Spa and Spb from the pressure sensors 27a and 27b, and the flow control signal Sf from the flow sensor 25, to output the valve opening degree control signal Cp, thereby performing feedback control of the opening/closing valve 24. That is, the flow rate setting signal Fs is input to the arithmetic and control unit 28a via the input-output circuit 28b, and the flow rate F of the fluid flowing in the mass flow control system 20 is regulated so as to correspond to the flow rate setting signal Fs. In detail, the arithmetic and control unit 28a feeds back to the opening/closing control valve 24 by use of an output (the pressure signal Spb) from the second pressure sensor 27b, in order to control the opening or closing of the opening/closing control valve 24, thereby controlling the flow rate F of the fluid flowing in the sonic nozzle 26, and the arithmetic and control unit 28a makes use of measurement of the actual flowing flow rate F by use of an output (the flow rate signal Sf) from the thermal type flow sensor 25, in order to check the operation of the mass flow control system 20.

Moreover, in the mass flow control system 20 of the models shown in FIG. 17 and FIG. 18, because two types of measurement methods of pressure type flow measurement using (i) the second pressure sensor 27b for performing flow control and (ii) a flow measurement using the thermal type flow sensor 25 for monitoring a flow rate are inputted to the arithmetic and control unit 8a, it is possible to easily and reliably monitor whether or not a fluid at a controlled flow rate (set flow rate Fs) is actually flowing. In other words, it is possible to easily and reliably monitor whether or not there is a difference between the controlled flow rate (i.e., the desired flow rate) and the real flow rate (i.e., the actual flow rate), which exerts a high practical effect.

However, there remain many problems to be explained in the mass flow control system 20 shown in FIG. 17 and FIG. 18. As a first problem, the arithmetic and control unit 28a is configured to control the opening and closing of the opening/closing control valve 24 by use of both signals of an output Spb from the second pressure sensor 27b and a flow rate output Sf from the thermal type flow sensor 25, and the arithmetic and control unit 28a corrects the flow rate output Sf from the thermal type flow sensor 25 by use of the output Spa from the first pressure sensor 27a. That is, the arithmetic and control unit 28a controls the opening and closing of the opening/closing control valve 24 by use of the three signals, namely, two pressure signals from the first pressure sensor 27a and the second pressure sensor 27b, respectively, and a flow rate signal from the thermal type flow sensor 25. Therefore, there is a problem that not only is the configuration of the arithmetic and control unit 28a complicated, but also stable flow control characteristics and the excellently high response characteristics of the pressure type flow control system FCS are reduced by opposites.

As a second problem, there is a problem when the installation position of the thermal type flow sensor 25 with respect to the opening/closing control valve 24 is changed. That is, in the mass flow control system 20 shown in FIG. 17 and FIG. 18, the response characteristics of the thermal type flow sensor 25 at the time of opening and closing of the opening/closing control valve 24, and the gas replacement characteristics and the vacuuming characteristics in the device main body are greatly altered by differences in installation position, so it is difficult to downsize the mass flow control system 20.

CITATION LIST

Patent Document

Patent Document 1: Japanese Patent No. 4137666

Problems to be Solved by the Invention

The present invention has been made to solve the aforementioned problems in the mass flow control system that uses a sonic nozzle in Japanese Patent No. 4137666, as shown in FIG. 17 and FIG. 18. That is, because the opening and closing of the opening/closing control valve 24 is controlled by use of two types of different signals of pressure signals from the first and second pressure sensors 27a and 27b, respectively, and by a flow rate signal from the thermal type flow sensor 25, to solve the problems discussed above, namely, that not only is the configuration of the arithmetic and control unit 28a complicated, but also that the excellently high response characteristics and stable flow control characteristics that the pressure type flow control system has might be diminished, it is unavoidable that the mass flow control system 20 grows to a large size, and then gas replacement characteristics are deteriorated and vacuuming takes a long time, and the like. Therefore, it is an object of the present invention to provide a pressure type flow control system with flow monitoring in which a flow control unit of a pressure type flow control system FCS using an orifice and a thermal type flow monitoring unit using a thermal type flow sensor are integrally combined, so as to independently carry out flow control and flow monitoring respectively. In this way, the pressure type flow control system with flow monitoring is made capable of making full use of the excellent flow characteristics of the pressure type flow control system, and carrying out flow monitoring by the thermal type flow sensor in a real-time manner, and is additionally capable of simplifying its arithmetic and control unit, improving gas replacement characteristics by drastically downsizing the device main body part, and the like.

Furthermore, it is an object of the present invention to provide a pressure type flow control system with flow monitoring in which a main body structure of the pressure type flow control system with flow monitoring is improved, and the flow rate of a fluid flowing in the main body of the flow control system (i.e., a flow rate detected by a thermal type flow monitoring unit 1b) is converted into a flow rate of the fluid detected by a flow control unit 1a by use of a gradient of control pressure in the fluid passage in the main body of the pressure type flow control system. Thus, a difference between the detected flow rate of the thermal type flow monitoring unit 1b and the detected flow rate of the pressure type flow control unit 1a is corrected, thereby improving the monitoring flow rate accuracy.

SUMMARY OF THE INVENTION

Means for Solving the Problems

The inventors of the present application have devised a pressure type flow control system with flow monitoring that is first based on a pressure type flow control system using an orifice, so as to use orifices of two configurations as in the dotted frames of FIG. 6 and FIG. 7 in order to carry out flow monitoring in real time. In FIG. 6 and FIG. 7, reference symbol 1 denotes a pressure type flow control system with flow monitoring, reference symbol 2 denotes a thermal type flow sensor, reference symbol 3 denotes a control valve, reference symbol 4 denotes a temperature sensor, reference symbol 5 denotes a pressure sensor, reference symbol 6 denotes an orifice, reference symbol 7 denotes a control unit, reference symbol 8 denotes an inlet side flow passage, reference symbol 9 denotes an outlet side flow passage, and reference symbol 10 denotes a fluid passage in a system main body. Moreover, the pressure type flow control system with flow monitoring in which the installation positions of the thermal type flow sensor 2 and the control valve 3 in FIG. 6 are exchanged, or switched, is the pressure type flow control system with flow monitoring in FIG. 7.

In addition, the reason that the pressure type flow control system using an orifice is employed as the system's flow control method is that the flow control characteristics are advantageous, with a long record of use, and the like. Furthermore, the reason that the thermal type flow sensor 2 is used as a sensor for flow monitoring is mainly because of its flow rate and the record of use as a sensor, and the excellent characteristics as a flow sensor, and the result of consideration of the point that the ease of real-time measurement, the responsiveness to a change of gas type, the accuracy of flow rate measurement, the record of use, and the like, are higher than those of the other flow rate measurement sensors. Moreover, the reason that the thermal type flow sensor 2 is integrally assembled in the fluid passage 10 in the system main body of the pressure type flow control system using the orifice is that it is easy to carry out flow monitoring and it is easy to downsize the pressure type flow control system with flow monitoring.

That is, the pressure type flow control system with flow monitoring 1 using an orifice, that has the configurations shown in FIG. 6 and FIG. 7 is based on pressure controlling flow control, and is characterized by that it is free of the influence of a supply pressure fluctuation. Consequently, it is possible to sense an anomaly in the orifice by utilizing the pressure drop characteristics on the upstream side of the orifice, and it is possible to monitor supply pressure with the pressure sensors built-in the system main body, and it is possible to continuously monitor the flow rate with the thermal type flow sensor.

On the other hand, as residual problems, first, an output fluctuation of the thermal type flow sensor due to a change in supply pressure may be envisioned. That is, because output from the thermal type flow sensor fluctuates due to a change in supply pressure, an error from the controlled flow rate may be caused at the time of changing supply pressure. Therefore, a response, such as easing an output fluctuation due to a change in supply pressure by delaying the response characteristics of the thermal type flow sensor, is required.

A second residual problem is in the point of conditions at the time of zero point adjustment. Generally, a zero point adjustment is executed under vacuuming in a pressure sensor, and is executed in the sealing state in a flow sensor. Accordingly, it is necessary to take care so as not to execute a zero point adjustment under wrong conditions.

A third residual problem is a thermal siphon phenomenon of the thermal type flow sensor. That is, it is necessary to determine an installing direction in advance due to mounting of the thermal type flow sensor and, as a result, it is necessary to review an installing direction of the pressure type flow control system concurrently with the design of the gas box.

The fourth residual problem is in the point of calibration of a live gas flow rate. Generally, in flow rate measurement, a flow rate output value from the thermal type flow sensor or the pressure type flow control system varies, even at the same flow rate, according to the gas type. As a result, it is necessary to add a system of automatically computing a conversion factor (C. F. value) of the thermal type flow sensor or a flow factor (F. F. value) of the pressure type flow control system at the site of using the pressure type flow control system.

The fifth residual problem is a response that occurs when a controlled flow rate is abnormal. In a current pressure type flow control system, an alarm and an error in controlled flow rate, and the like, are indicated on a display. Meanwhile, a system that judges the controlled flow rate as abnormal is required when an output difference between monitored flow rates of the pressure type flow control system and the thermal type flow sensor exceeds a predetermined threshold value.

Then, first, the inventors of the invention of present application have conducted evaluation tests for various types of characteristics with respect to the thermal type flow sensor 2, which is newly incorporated in the respective pressure type flow control systems with flow monitors in accordance with embodiments of FIG. 6 and FIG. 7.

That is, as shown in FIG. 6 and FIG. 7, a fluid supply source 11 that it formed of a $N_2$ container, a pressure regulator 12, a purge valve 13, and an inlet side pressure sensor 14 are connected to the inlet side flow passage 8, and a data logger (NR500) 15 is connected to the control unit 7. Moreover, a characteristics evaluation system is configured that performs vacuuming of the outlet side flow passage 9 by a vacuum pump 16. This characteristics evaluation system is also used to evaluate the step response characteristics of the thermal type flow sensor 2, the monitoring flow rate accuracy, the supply pressure fluctuating characteristics, and the repetitive reproducibility.

The above-described step response characteristics are evaluated as response characteristics of thermal type flow sensor outputs to step inputs set at predetermined flow rates, and output responses, in the case where the set flow rate is changed in steps from 100% (full scale) F. S.=1000 (sccm) to 20%, 50% and 100%, are evaluated. FIG. 8, FIG. 9 and FIG. 10 show the measurement results of a flow rate setting input $A_1$ of the pressure type flow control system 1 and a flow rate output $A_2$ at that time, a thermal type flow sensor output $B_1$ (in the case of FIG. 6), and a thermal type flow sensor output $B_2$ (in the case of FIG. 7) in the data logger 15, in the case where the set flow rates are 20%, 50% and 100%, respectively.

As is also clear from FIG. 8 to FIG. 10, it has been confirmed that the outputs from the thermal type flow sensor 2 converge within ±2% of the set output within about 4 seconds from the start of the setting.

The monitoring flow rate accuracy has been measured and evaluated as amounts of changes in thermal type flow sensor outputs when a set value is shifted in units of set points (S. P.) from the respective flow rate settings, and the error setting conditions are −0.5% S. P., −1.0% S. P., −2.0% S. P., and −3.0% S. P.

As is also clear from FIG. 11 and FIG. 12, it has become apparent that the monitoring flow rate accuracy of the thermal type flow sensor 2 changes in units of set points (S. P.) according to the flow rate setting.

The supply pressure fluctuating characteristics show a fluctuating state of thermal type flow sensor outputs in the case where supply pressure is fluctuated while controlling at a constant flow rate, and have been measured with a flow rate setting of 50% and a fluctuation condition of supply pressure of 50 kPaG.

FIG. 13 shows the measurement results thereof, and it has become apparent that, in the case where the thermal type flow sensor 2 is set on the upstream side (primary side) of the control valve 3 (in the case of FIG. 6), the change in flow rate output from the thermal type flow sensor 2 due to a fluctuation in supply pressure exceeds a range of ±0.5% F. S./div by far. Meanwhile, in the case where the thermal type flow sensor 2 is set on the downstream side (secondary side) of the control valve 3 (in the case of FIG. 7), the change in flow rate output diverges within the range of ±0.5% F. S./div, which means that the thermal type flow sensor 2 is less likely to be influenced by a fluctuation in gas supply pressure.

The repetitive reproducibility has been measured as reproducibility of the thermal type flow sensor outputs $B_1$ and $B_2$ by repetitively inputting a flow rate from 0% to the set flow rates when the set flow rate is set to 20% and 100%.

As is also clear from FIG. 14 and FIG. 15, it has become apparent that the repetitive reproducibility of the thermal type flow sensor outputs falls within the ranges of ±1% F. S. and ±0.2% F. S., and regular and precise reproducibility has been shown.

In addition, the thermal type flow sensors 2 used in FIG. 6 and FIG. 7 are sensors mounted in the FCS-T1000 series manufactured by Fujikin Incorporated, and are used widely as thermal type flow sensors for a so-called "thermal type mass flow control system" (i.e., a mass flow controller).

From the results of the respective evaluation tests described above (i.e., the step response characteristics, the monitoring flow rate accuracy characteristics, the supply pressure fluctuating characteristics, and the repetitive reproducibility characteristics), on the basis of FIG. 6 and FIG. 7 with respect to the thermal type flow sensor 2, the inventors of the invention of the present application have found that there are no relative merits whether an installation position of the thermal type flow sensor 2 is on the upstream side (primary side) or on the downstream side (secondary side) of the control valve 3 from the viewpoint of the step response characteristics, the monitoring flow rate accuracy characteristics, and the repetitive reproducibility characteristics. On the other hand, the thermal type flow sensor 2 is preferably installed on the downstream side (secondary side) of the control valve 3 of the pressure type flow control system, that is, it preferably has the configuration of FIG. 7 from the viewpoint of the supply pressure fluctuating characteristics.

Furthermore, the inventors have found that, in the case where the thermal type flow sensor 2 is installed on the downstream side (secondary side) of the control valve 3, the content volume between the control valve 3 and the orifice 6 is increased, thereby negatively affecting the gas replacement characteristics, and delaying the pressure drop characteristics (i.e., deteriorating the outgassing characteristics) in the case of a low flow rate type pressure type flow control system, and these factors, or the like, become problems.

Therefore, the respective evaluation tests shown in FIG. 6 and FIG. 10 constitute results in the case where a pressure type flow control system with flow monitoring at a maximum controlled flow rate of 1000 SCCM (Standard Cubic Centimeters per Minute) is used, and its fluid supply pressure is set to 350 kPaG. It is unclear what kinds of response characteristics are obtained in the case where the pressure type flow control system with flow monitoring is at a maximum controlled flow rate (i.e., full-scale flow rate) other than 1000 SCCM. Then, the inventors of the invention of the present application have carried out the response characteristics tests at a fluid supply pressure of 300 kPaG by use of the pressure type flow control system with flow monitoring at a maximum controlled flow rate of 2000 SCCM (hereinafter called F. S. 2S LM), and at a maximum controlled flow rate of 1000 SCCM (hereinafter called F. S. 100 SCCM) by use of an evaluation test device shown in FIG. 7.

FIG. 19 shows the results of the response characteristics tests in the case where the controlled flow rate setting is from 0% to 50%, and from 50% to 0%, and the results in the case where fluid supply pressure is set to 300 kPaG ($N_2$) by use of the pressure type flow control system with flow monitoring at F. S. 2S LM. As is also clear from FIG. 19, an output $B_2$ from the thermal type flow monitoring unit 1b in FIG. 1 (i.e., a real-time monitoring flow rate detected by the thermal type flow sensor 2) reaches a stable detection value within one second from the start of detection, and a so-called overshoot phenomenon is not shown in the case of F. S. 2S LM.

On the other hand, FIG. 20 shows the test results at F. S. 100 SCCM in the case where the controlled flow rate setting is from 0% to 50%, and from 50% to 0%, and an output $B_2$ from the thermal type flow monitoring unit 1b (a real-time monitoring flow rate) reaches a stable detection value within one second, although a considerably great overshoot (influx) transiently occurs. In this way, it has become apparent that there is a problem that, in the case of the pressure type flow control unit 1a at a small flow volume, an overshoot occurs in the detection value of the thermal type flow monitoring unit 1b, which reduces the accuracy of measurement of the monitoring flow rate value.

Then, the inventors of the invention of the present application have reviewed the cause for the occurrence of this transient overshoot in a detection value of the thermal type flow monitoring unit 1b, and a prevention measure therefor, and conceived that the structure of the main body of the pressure type flow control system with flow monitoring is structured so as to make its internal fluid passage volume (i.e., a passage volume between the control valve 3 and the orifice 6 in FIG. 7) as small as possible, and a detection value of the thermal type flow monitoring unit 1b is corrected by use of a gradient of control pressure of the fluid passage between the control valve 3 and the orifice 6, so as to decrease a difference between the detection flow values of the thermal type flow monitoring unit 1b and the pressure type flow control unit 1a.

Moreover, in the case where the pressure type flow control system with flow monitoring is attached to a gas supply apparatus, or the like, it is necessary to memorize a so-called "live gas output initial value" (hereinafter called MFM output initial value) of the thermal type flow monitoring unit 1b corresponding to a gas type serving as a standard for monitoring flow rate self-diagnosis. Therefore, the inventors of the invention of the present application have reviewed the procedure for memorizing a live gas MFM output initial value in the case where the pressure type flow control system with flow monitoring is attached to actual equipment including the case where the pressure, positioning type flow control system with flow monitoring is replaced, and reviewed a method for checking a live gas MFM output as well. Thus, the present inventors have devised automation of memorizing a live gas MFM output initial value (i.e., recording and/or storing the live gas MFM output initial value into a memory device) and checking of the live gas MFM output.

The present invention, according to the first to seventh non-limiting, illustrative embodiments of the invention, has been created based on the results of the above-described respective evaluation tests conducted by the inventors of the present application. Thus, in accordance with a first non-limiting illustrative embodiment of the present invention, the indispensable constituent features of the invention include an inlet side passage 8 for fluid, a control valve 3 composing a pressure type flow control unit 1a that is connected to a downstream side of the inlet side passage 8, a thermal type flow sensor 2 that is connected to a downstream side of the control valve 3, an orifice 6 that is installed along the way of a fluid passage 10 communicatively connected to a downstream side of the thermal type flow sensor 2, a temperature sensor 4 that is provided near the fluid passage 10 between the control valve 3 and the orifice 6, a pressure sensor 5 that is provided for the fluid passage 10 between the control valve 3 and the orifice 6, an outlet side passage 9 that is communicatively connected to the orifice 6, and a control unit 7 that is composed of a pressure type flow rate arithmetic and control unit 7a to which a pressure signal from the pressure sensor 5 and a temperature signal from the temperature sensor 4 are input.

The pressure type flow rate arithmetic and control unit $7a$ computes a flow rate value Q of fluid flowing through the orifice 6, and outputs a control signal Pd for bringing the control valve 3 into an opening or closing action in a direction in which a difference between the computed flow rate value and a set flow rate value is decreased, to a valve drive unit $3a$, and a flow sensor control unit $7b$ to which a flow rate signal Pc from the thermal type flow sensor 2 is input, and computes a flow rate of the fluid flowing through the orifice 6 according to the flow rate signal Pc, to indicate the flow rate.

In accordance with a second non-limiting, illustrative embodiment of the present invention, in the invention according to the first non-limiting embodiment, the pressure sensor 5 is provided between the outlet side of the control valve 3 and the inlet side of the thermal type flow sensor 2.

In accordance with a third non-limiting, illustrative embodiment of the present invention, in the invention according to the first non-limiting embodiment or the second non-limiting embodiment, when a difference between the flow rate of the fluid computed by the flow sensor control unit $7b$ and flow rate of the fluid computed by the pressure type flow rate arithmetic and control unit $7a$ exceeds a set value, the control unit 7 performs an alarm indication.

In accordance with a fourth non-limiting illustrative embodiment of the present invention, in the invention according to the first non-limiting embodiment, the control valve 3, the thermal type flow sensor 2, the orifice 6, the pressure sensor 5, the temperature sensor 4, the inlet side passage 8, and the outlet side passage 9 are integrally assembled in one body, and the fluid passage 10 is integrally formed in the body.

In accordance with a fifth non-limiting illustrative embodiment of the present invention, the indispensable constituent features of the invention include an inlet side passage for fluid 8, a control valve 3 composing a pressure type flow control unit $1a$ that is connected to a downstream side of the inlet side passage 8, a thermal type flow sensor 2 that is connected to a downstream side of the control valve 3, an orifice 6 that is installed along the way of a fluid passage 10 communicatively connected to a downstream side of the thermal type flow sensor 2, a temperature sensor 4 that is provided near the fluid passage 10 between the control valve 3 and the orifice 6, a pressure sensor 5 that is provided for the fluid passage 10 between the control valve 3 and the orifice 6, an outlet side passage 9 that is communicatively connected to the orifice 6, a pressure sensor 17 that is provided for the outlet side passage 9 on the downstream side of the orifice 6, and a control unit 7 that is composed of a pressure type flow rate arithmetic and control unit $7a$ to which pressure signals from the pressure sensor 5 and the pressure sensor 17 and a temperature signal from the temperature sensor 4 are input, and monitors critical expansion conditions of a fluid flowing through the orifice 6, and computes a flow rate value Q of the fluid flowing through the orifice 6, and outputs a control signal Pd for bringing the control valve 3 into an opening or closing action in a direction in which a difference between the computed flow rate value and a set flow rate value is decreased, to a valve drive unit $3a$, and a flow sensor control unit $7b$ to which a flow rate signal Pc from the thermal type flow sensor 2 is input, and computes a flow rate of the fluid flowing through the orifice 6 according to the flow rate signal Pc, to indicate the flow rate.

In accordance with a sixth non-limiting, illustrative embodiment of the present invention, in the fifth non-limiting embodiment of the invention, the control unit 7 performs an alarm indication when the fluid flowing through the orifice 6 is out of the critical expansion conditions.

In accordance with a seventh non-limiting, illustrative embodiment of the present invention, in the fifth non-limiting embodiment of the invention, the control valve 3, the thermal type flow sensor 2, the orifice 6, the pressure sensor 5, the temperature sensor 4, the inlet side passage 8, the outlet side passage 9, and the pressure sensor 17 are integrally assembled in one body.

The inventions according to the eighth to eleventh non-limiting, illustrative embodiments of the present invention have been created based on the review according to downsizing of the pressure type flow control system with flow monitoring, and an improvement in the response characteristics and the control accuracy of a monitoring controlled flow rate by the inventors of the present application. In accordance with an eighth non-limiting, illustrative embodiment of the present invention, in the invention according to the fourth non-limiting embodiment, the body 30 is formed by integrally assembling a first main body block $30a$, a second main body block $30b$, a third main body block $30c$, and a fourth main body block $30d$ to be integrally interconnected, and, respectively, the control valve 3 is installed on a top surface side of the first main body block $30a$, a laminar flow element $2d$ is installed on an internal left side surface of the third main body block $30c$, the orifice 6 is installed on an internal right side surface of the third main body block $30c$, the pressure sensor 5 is installed on a bottom surface side of the third main body block $30c$, and a sensor circuit $2b$ of the thermal type flow sensor 2 is installed on a top surface side of the third main body block $30c$, and a fluid passage 10 communicatively connected to the respective main body blocks $30a$ to $30d$ is formed.

In accordance with a ninth non-limiting illustrative embodiment of the present invention, in the invention according to the seventh non-limiting embodiment, the body 30 is formed by integrally assembling the first main body block $30a$, the second main body block $30b$, the third main body block $30c$, and the fourth main body block $30d$ to be integrally interconnected, and, respectively, the control valve 3 is installed on a top surface side of the first main body block $30a$, the laminar flow element $2d$ is installed on an internal left side surface of the third main body block $30c$, the orifice 6 is installed on an internal right side surface of the third main body block $30c$, the pressure sensor 5 is installed on a bottom surface side of the third main body block $30c$, a sensor circuit $2b$ of the thermal type flow sensor 2 is installed on a top surface side of the third main body block $30c$, and the pressure sensor 17 is installed on a top surface side of the fourth main body block $30d$, and fluid passages 8, 9, and 10 communicatively connected to the respective main body blocks $30a$ to $30d$ are formed.

In accordance with a tenth non-limiting, illustrative embodiment of the present invention, in the invention according to the first non-limiting embodiment or the fifth non-limiting embodiment, a monitoring flow rate output correction circuit H that corrects a monitoring flow rate $B_2$ computed on the basis of a flow rate signal from the thermal type flow sensor 2 is provided for the flow sensor control unit $7b$, and the monitoring flow rate output correction circuit H corrects the monitoring flow rate $B_2$ to be $B_2' = B_2 - C \cdot \Delta P/\Delta t$ (however, C is a conversion factor) by use of a gradient $\Delta P/\Delta t$ of fluid control pressure, and outputs the corrected monitoring flow rate output $B_2'$ as a monitoring flow rate.

In accordance with an eleventh non-limiting, illustrative embodiment of the present invention, in the invention according to the first non-limiting embodiment or the fifth non-limiting embodiment, the monitoring flow rate output correction circuit H is composed of a differentiating circuit 40 for a controlled flow rate output $A_2$ from the pressure type flow control unit 1a, an amplifying circuit 41 for an output value from the differentiating circuit 40, a shaping circuit 42 for an output from the amplifying circuit 41, and a correction circuit 43 that subtracts an input from the shaping circuit 42 from the monitoring flow rate output $B_2$ from the thermal type flow monitoring unit 1b, to output a monitoring flow rate output $B_2'$.

Moreover, the inventions according to the twelfth to sixteenth non-limiting, illustrative embodiments have been created based on the review according to a live gas MFM output initial value, and the like, of the pressure type flow control system with flow monitoring by the inventors of the invention of the present application. In accordance with a twelfth non-limiting, illustrative embodiment of the present invention, a basic configuration of the invention includes, in the pressure type flow control system with flow monitoring according to the first non-limiting embodiment or the fifth non-limiting embodiment, after attaching the pressure type flow control system with flow monitoring to a pipe passage, first, introducing a $N_2$ gas, to compare a controlled flow rate output $A_2$ from the pressure type flow control unit 1a and a monitoring flow rate output $B_2'$ from the thermal type flow monitoring unit 1b, in a case where a difference between them both is within an allowable range, next, introducing a live gas, to detect and memorize an initial value of the monitoring flow rate output from the thermal type flow monitoring unit at each set flow rate value, thereafter, comparing the monitoring flow rate output $B_2'$ from the thermal type flow monitoring unit 1b with the controlled flow rate output $A_2$ from the pressure type flow control unit 1a according to a result of flow rate self-diagnosis for the live gas, and when a difference between them both is within an allowable range, outputting the live gas monitoring flow rate output $B_2'$, and validating the initial value memory.

In accordance with a thirteenth non-limiting, illustrative embodiment of the present invention, in the invention according to the twelfth non-limiting embodiment, after introducing the $N_2$ gas, a flow rate self-diagnosis is performed by use of the $N_2$ gas, to check that there is no anomaly in the system.

In accordance with a fourteenth non-limiting, illustrative embodiment of the present invention, in the invention according to the twelfth non-limiting embodiment or the thirteenth non-limiting embodiment, after introducing the live gas, a flow rate self-diagnosis is performed by use of the live gas, to check that there are no anomalies in the system and the live gas.

In accordance with a fifteenth non-limiting, illustrative embodiment of the present invention, in the invention according to the twelfth non-limiting embodiment, the thirteenth non-limiting embodiment, or the fourteenth non-limiting embodiment, before introducing the $N_2$ gas and/or before introducing the live gas, vacuuming to perform automatic zero-point adjustments for the pressure sensor 5 and for the thermal type flow sensor 2 of the pressure type flow control system with flow monitoring.

In accordance with a sixteenth non-limiting, illustrative embodiment of the present invention, in the invention according to the twelfth non-limiting embodiment, measuring a flow rate output from the thermal type flow sensor 2 after a predetermined latency time t from the start of output at each of a plurality of predetermined set flow rates of the pressure type flow control unit 1a, so as to memorize or check the measured value automatically corrected.

Effects of the Invention

In the present invention, the pressure type flow control system with flow monitoring is formed of the pressure type flow control unit 1a and the thermal type flow monitoring unit 1b, and the thermal type flow sensor 2 of the thermal type flow monitoring unit 1b is located on the downstream side of the control valve 3, to be organically integrated, and the control unit 7 is configured by integrating the pressure type flow rate arithmetic and control unit 7a that controls driving of opening and closing of the control valve 3 of the pressure type flow control unit 1a, and the flow sensor control unit 7b that computes a real flow rate of fluid flowing through the orifice 6 with a flow rate signal from the thermal type flow sensor 2 of the thermal type flow monitoring unit 1b, and indicates the real flow rate, which are independent of each other.

As a result, with the control unit 7 having a simple configuration, it is possible to easily and precisely perform stable pressure type flow control, and it is also possible to continuously and precisely carry out flow monitoring by using the thermal type flow sensor 2 in real time.

Furthermore, because of the configuration in which the thermal type flow sensor 2 is located on the downstream side of the control valve 3, and the respective device main bodies such as the control valve 3 and the thermal type flow sensor 2 are integrally assembled in one body, the internal space volumes of the system main bodies are considerably reduced, which does not negatively affect the characteristics of the gas replacement characteristics and the vacuuming characteristics. Moreover, even when there is a fluctuation in fluid pressure on the side of the fluid supply source, a great fluctuation is not caused in the output characteristics of the thermal type flow sensor 2. As a result, it is possible to perform stable flow monitoring and flow control with respect to the fluctuation in pressure on the side of the fluid supply source.

In the pressure type flow control system with flow monitoring of the present invention, because of the configuration in which the system main body 30 is formed by combining the four main body blocks, necessary fluid passages, and the like, are formed in the respective block bodies. Moreover, the control valve 3 is housed in the first main body block 30a, the prefilter 29 is housed between the second main body block 30b and the first main body block 30a, and the laminar flow element 2d and the orifice 6 are housed in the third main body block 3c, and the respective main body blocks 30a to 30d are interconnected in an airtight manner, so it is possible to downsize the body 30, and considerably reduce the internal volume (the length and the section area) of the fluid passage 10 on the outlet side of the control valve 3 and the upstream side of the orifice 6. This structure reduces the overshoot of the thermal type flow sensor 2, and the like, thereby improving the response characteristics of flow control and it is possible to considerably improve the control accuracy.

Furthermore, the monitoring flow rate output correction circuit H of the thermal type flow sensor 2 is provided, and with this circuit, the monitoring flow rate detection value $B_2$ is corrected by use of a gradient $\Delta P/\Delta t$ of control pressure in the fluid passage 10 in the body 30, and it is judged whether or not the monitoring flow rate is appropriate with this corrected monitoring flow rate detection value $B_2'$. Therefore, it is possible to perform flow rate monitoring and flow control with a higher degree of accuracy and with higher response characteristics.

Moreover, because the monitoring flow rate output $B_2'$ corrected by the monitoring flow rate output correction circuit H of the thermal type flow sensor 2 serves as an initial memory value, higher-accuracy monitoring flow rate self-diagnosis for live gas is made possible.

BRIEF DESCRIPTION OF THE DRAWINGS

FIG. 21(d) is a bottom view thereof.

FIG. 25 shows response characteristics at 80%→100%→80% and 0%→100%→0% in the system of FIG. 23.

FIG. 30(a) is a briefing diagram of an initial value memory process for a thermal type flow sensor flow rate output with respect to a live gas in FIG. 29.

FIG. 30(b) is a briefing diagram of a checking process for a thermal type flow sensor flow rate output.

DETAILED DESCRIPTION OF THE INVENTION

Detailed Description of the Preferred Embodiments

Figure 1:
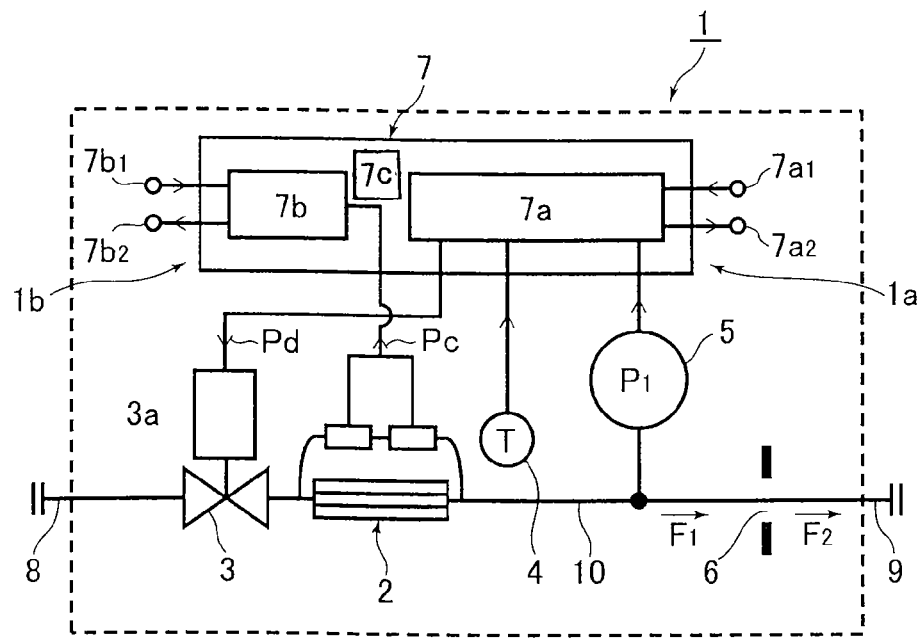
FIG. 1 is a schematic diagram of a configuration of a pressure type flow control system with flow monitoring utilizing an orifice according to an embodiment of the present invention.

Hereinafter, an embodiment of the present invention will be described with reference to the drawings included with this disclosure. FIG. 1 is a schematic diagram of a configuration according to an embodiment of a pressure type flow control system with flow monitoring 1 according to the present invention. The pressure type flow control system 1 with flow monitoring is composed of a pressure type flow control unit 1a and a thermal type flow monitoring unit 1b.

Furthermore, the pressure type flow control unit 1a is composed of a control valve 3, a temperature sensor 4, a pressure sensor 5, an orifice 6, and a pressure type flow rate arithmetic and control unit 7a forming a component of a control unit 7.

Moreover, the thermal type flow monitoring unit 1b is composed of a thermal type flow sensor 2 and a flow sensor control unit 7b forming another component of the control unit 7.

The pressure type flow control unit 1a is, as described above, composed of the control valve 3, the temperature sensor 4, the pressure sensor 5, the orifice 6, the pressure type flow rate arithmetic and control unit 7a, and the like. A flow rate setting signal is output from an input terminal $7a_1$, and a flow rate output signal of a fluid flowing through the orifice, which has been computed by the pressure type flow control unit 1a, is output from an output terminal $7a_2$.

The pressure type flow control unit 1a itself, which uses the orifice 6, is a publicly-known technique as evident by Japanese Patent No. 3291161, and as evident by U.S. Pat. No. 5,791,369 that is incorporated herein by reference, and the like, and computes a flow rate of a fluid flowing through the orifice 6 under the critical expansion conditions on the basis of pressure detected by the pressure detection sensor 5, with the pressure type flow rate arithmetic and control unit 7a, and outputs a control signal Pd proportional to a difference between the set flow rate signal input from the input terminal $7a_1$ and the computed flow rate signal to a valve drive unit 3a of the control valve 3.

Figure 16:
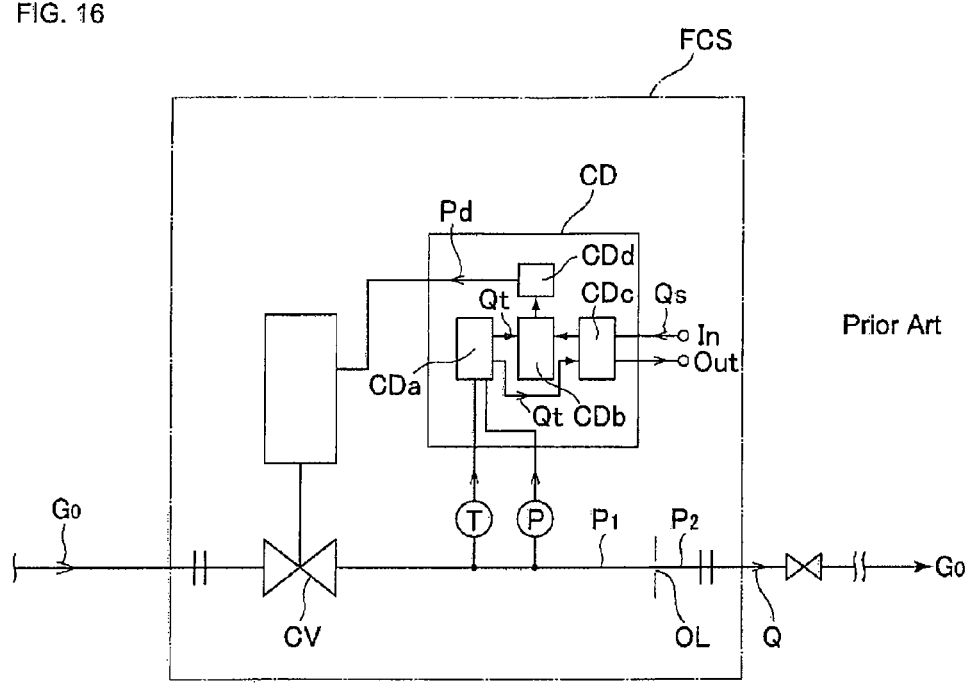
FIG. 16 is a configuration diagram of a pressure type flow control system using an orifice.
Figure 17:
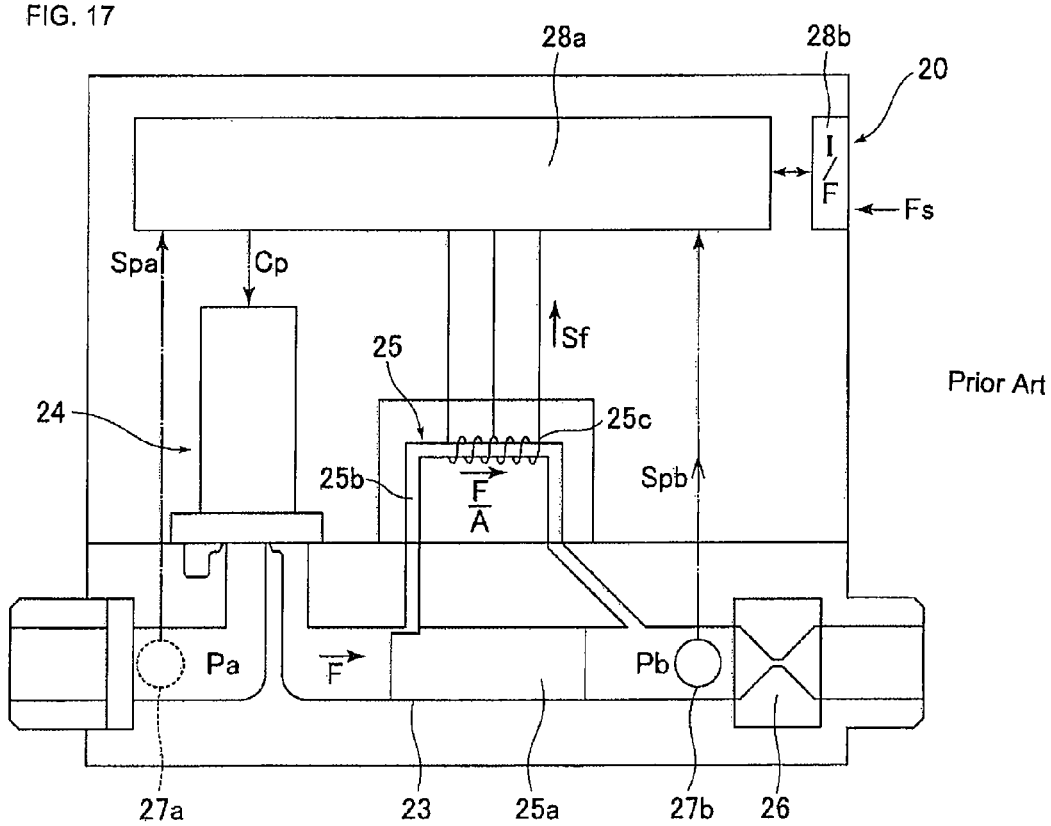
FIG. 17 is an explanatory diagram of a configuration of a mass flow control system according to a first embodiment of Japanese Patent No. 4137666.
Figure 18:
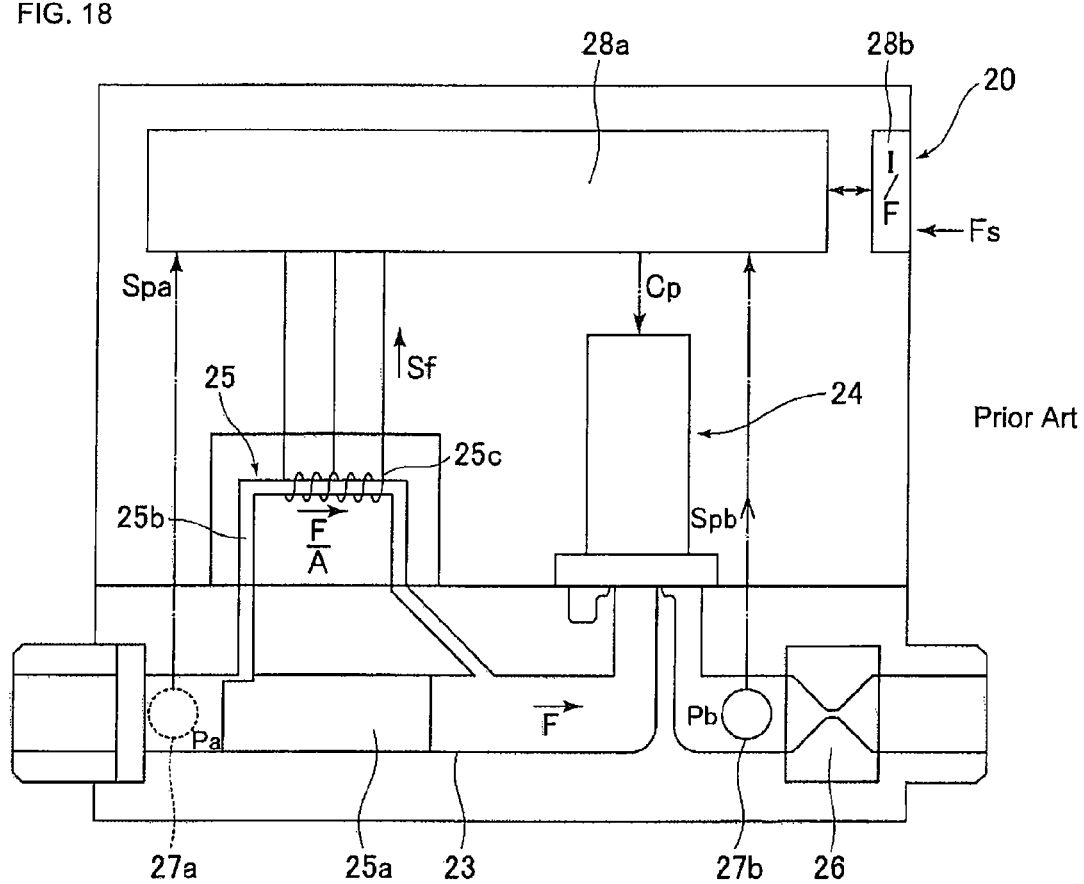
FIG. 18 is an explanatory diagram of a configuration of a mass flow control system according to a second embodiment of Japanese Patent No. 4137666.

Because the configurations of the pressure type flow control unit 1a and the flow rate arithmetic and control unit 7a thereof are substantially the same as those described in FIG. 16, detailed descriptions thereof are omitted here. Furthermore, as a matter of course, various types of ancillary mechanisms such as the publicly-known zero-point adjustment mechanism and flow rate anomaly detection mechanism, and a gaseous species conversion mechanism (F. F. value conversion mechanism), are provided in the pressure type flow control unit 1a. Moreover, in FIG. 1, reference symbol 8 denotes an inlet side passage, reference symbol 9 denotes an outlet side passage, and reference symbol 10 denotes a fluid passage in the device main body.

The thermal type flow monitoring unit 1b composing the pressure type flow control system 1 with flow monitoring is composed of the thermal type flow sensor 2 and the flow sensor control unit 7b, and an input terminal $7b_1$ and an output terminal $7b_2$ are respectively provided for the flow sensor control unit 7b. Then, a setting signal within a flow rate range to be monitored is input from the input terminal $7b_1$, and a monitoring flow rate signal (i.e., a real flow rate signal) detected by the thermal type flow sensor 2 is output from the output terminal $7b_2$. In addition, as a matter of course, ancillary mechanisms such as a gaseous species conversion mechanism (C. F. value conversion mechanism) are provided in the thermal type flow monitoring unit 1b as well.

Furthermore, although not shown in FIG. 1, as a matter of course, input and output of the monitoring flow rate signal and a computed flow rate signal are appropriately carried out between the flow sensor control unit 7b and the pressure type flow rate arithmetic and control unit 7a, and a difference between them both and a level of the difference may be monitored, or a warning may be issued in the case where the difference between the monitoring flow rate signal and the computed flow rate signal exceeds a given value.

Figure 2:
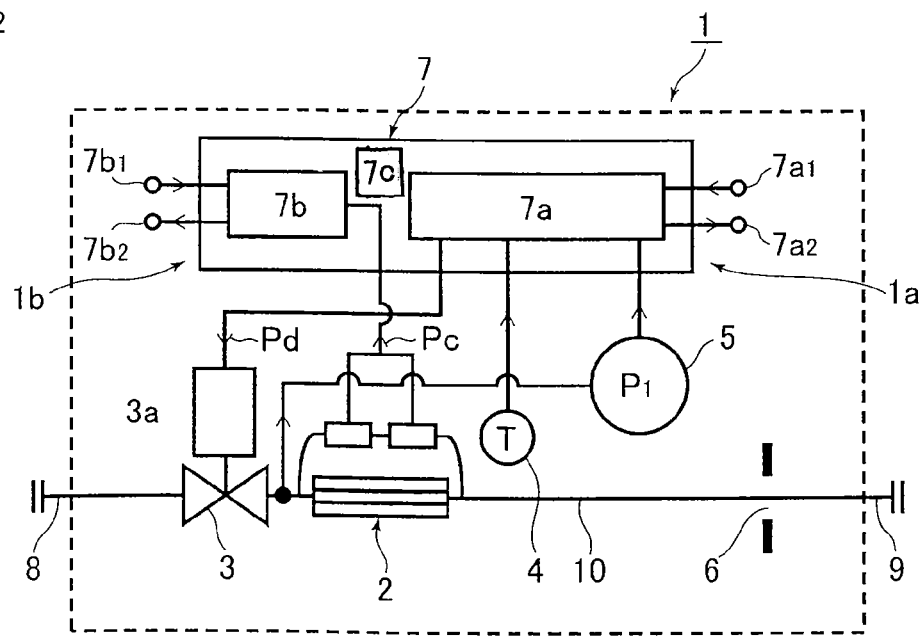
FIG. 2 is a schematic diagram of a configuration showing another example of the pressure type flow control system with flow monitoring.

FIG. 2 shows another example of the pressure type flow control system 1 with flow monitoring, which is configured to detect fluid pressure between the control valve 3 and the thermal type flow sensor 2 with the pressure sensor 5. In addition, other configurations and operations of the pressure type flow control system 1 with flow monitoring are completely the same as those in the case of FIG. 1.

Figure 3:
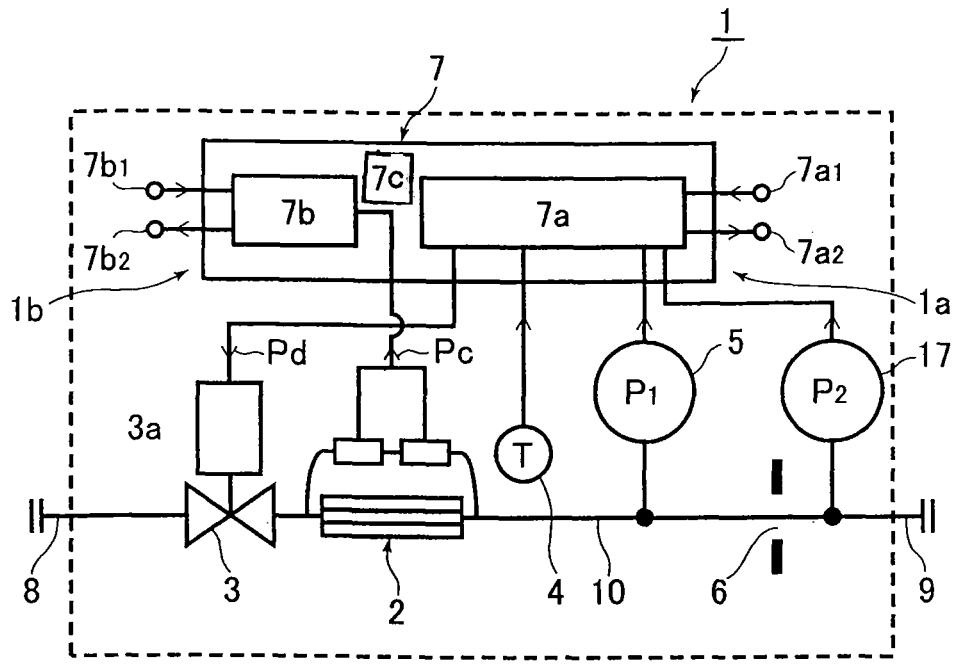
FIG. 3 is a schematic diagram of a configuration showing yet another example of the pressure type flow control system with flow monitoring.

FIG. 3 shows yet another example of the pressure type flow control system 1 with flow monitoring, and a pressure sensor 17 is separately installed on the downstream side of the orifice 6, which makes it possible to monitor whether or not the fluid flowing through the orifice 6 is under the critical expansion conditions, to issue an alarm, or to perform flow control by use of differential pressure between the pressure sensor 5 and the pressure sensor 17.

Figure 4:
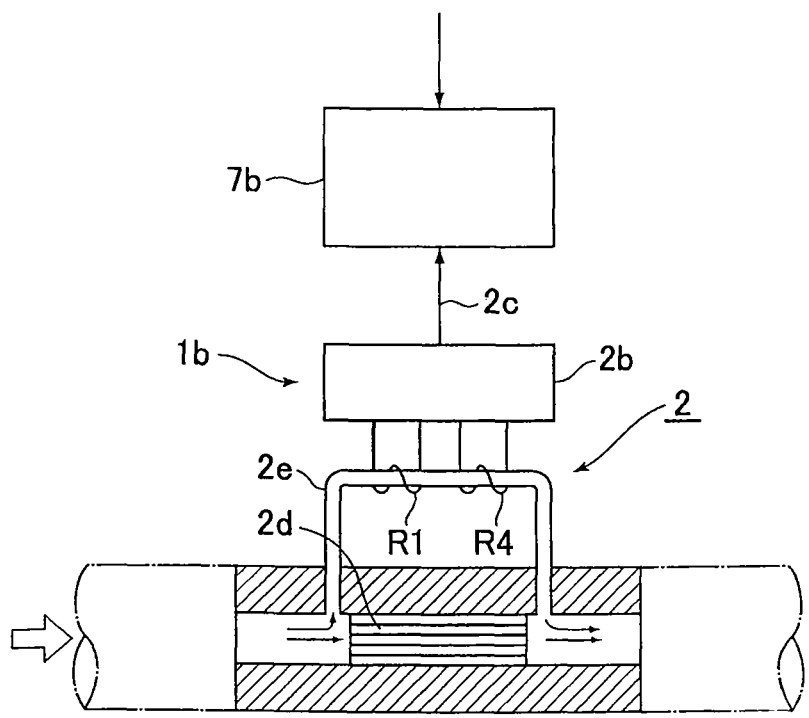
FIG. 4 is an explanatory diagram of a configuration of a thermal type flow sensor.
Figure 5:
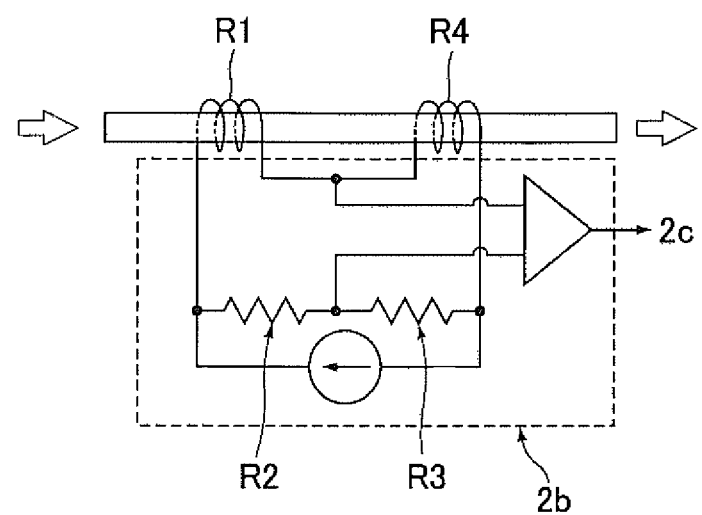
FIG. 5 is an explanatory diagram of the principle of operation of the thermal type flow sensor.

The thermal type flow monitoring unit 1b is composed of the thermal type flow sensor 2 and the flow sensor control unit 7b, and FIG. 4 and FIG. 5 show an outline of the configuration thereof. That is, as shown in FIG. 4, the thermal type flow sensor 2 has a laminar flow element (a bypass pipe group) 2d and a sensor pipe 2e, which bypasses the laminar flow element 2d, and a gas fluid of a small quantity compared to the laminar flow element 2d is made to flow through the sensor pipe 2e at a constant ratio. Furthermore, a pair of resistance wires R1 and R4 for control, which are series-connected, are rolled around the sensor pipe 2e to output a flow rate signal 2c indicating a mass flow rate value that is monitored by a sensor circuit 2b connected to the resistance wires R1 and R4.

The flow rate signal 2c is introduced into the flow sensor control unit 7b composed of, for example, a microcomputer or the like, to determine a real flow rate of a currently flowing fluid on the basis of the flow rate signal 2c.

FIG. 5 shows a basic structure of the sensor circuit 2b of the thermal type flow sensor 2, and the series-connected circuits of two standard resistors R2 and R3 are connected in parallel to the series-connection of the resistance wires R1 and R4 described above, so as to form a bridge circuit. A constant current source is connected to this bridge circuit, and a connecting point between the resistance wires R1 and R4 and a connecting point between the standard resistors R2 and R3 are connected to the input side, to provide a differential circuit, that is configured to determine a potential difference between the two connecting points, to output this potential difference as the flow rate signal 2c.

In addition, because the thermal type flow sensor 2 and the flow sensor control unit 7b themselves are publicly known devices, detailed descriptions thereof are omitted here. Furthermore, in the present embodiment, a thermal type flow sensor mounted in the FCS-T1000 series manufactured by Fujikin Incorporated is used as the thermal type flow monitoring unit 1b.

Figure 21:
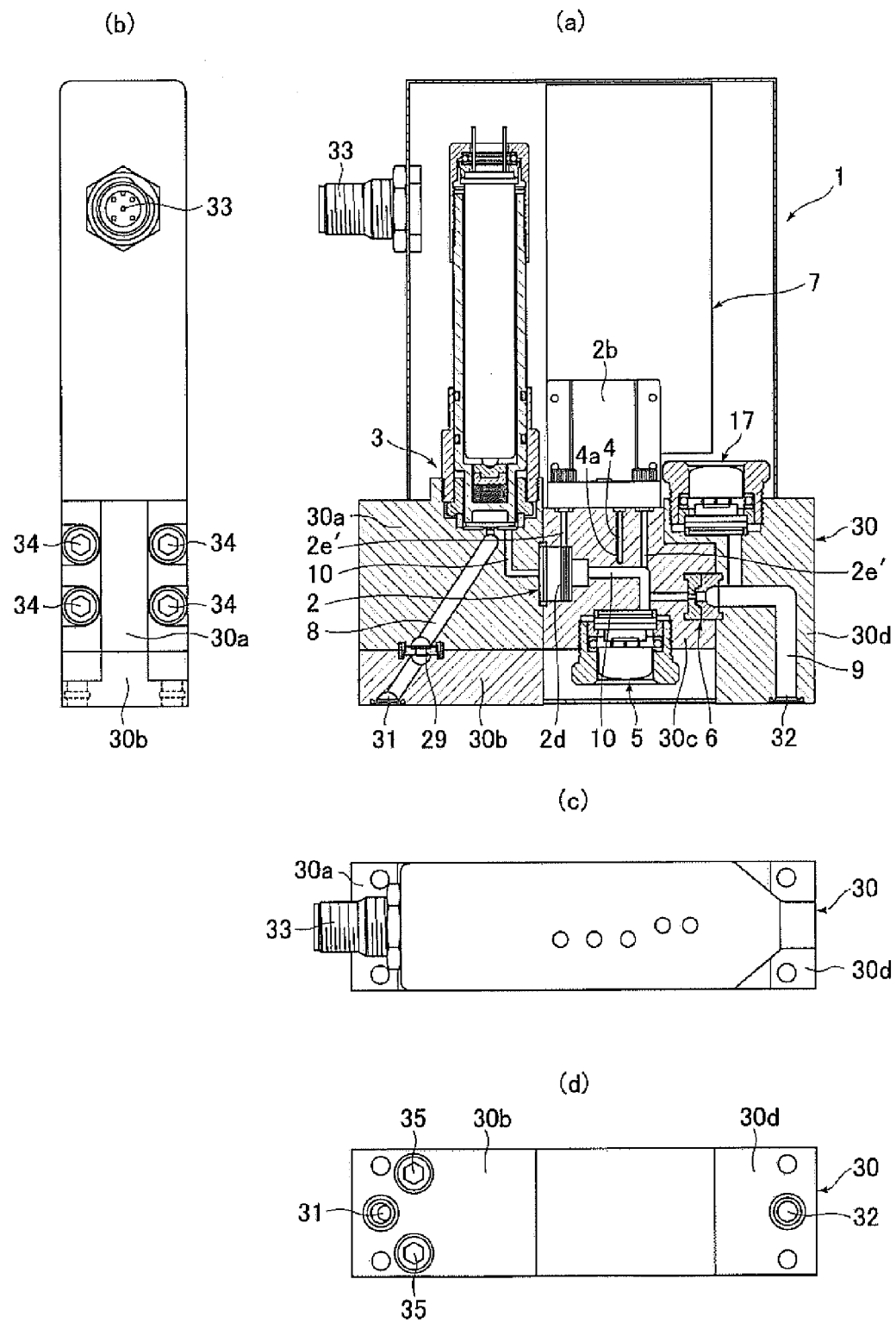
FIG. 21 are schematic diagrams showing a structure of the pressure type flow control system with flow monitoring, wherein FIG. 21 (a) is a longitudinal sectional front view thereof, FIG. 21 (b) is a left side view thereof, FIG. 21 (c) is a plan view thereof.

FIG. 21 includes schematic diagrams showing a structure of the pressure type flow control system 1 with flow monitoring according to the present invention. In particular, FIG. 21 (a) is a longitudinal sectional view thereof, FIG. 21 (b) is a left side view thereof, FIG. 21(c) is a plan view thereof, and FIG. 21(d) is a bottom view thereof.

The pressure type flow control system 1 with flow monitoring composed of the pressure type flow control unit 1a and the thermal type flow monitoring unit 1b shown in FIG. 1 and FIG. 21 is formed of the body 30 and the control unit 7, and the control valve 3, the thermal type flow sensor 2, the temperature sensor 4, the pressure sensor 5, and the orifice 6, and the like, which are assembled in the body 30, and further, the control unit 7 is formed of the pressure type flow control unit 7a and the flow sensor control unit 7b.

The body 30 is formed of the first main body block 30a, the second main body block 30b, the third main body block 30c, and the fourth main body block 30d, and the first main body block 30a, the third main body block 30c, and the fourth main body block 30d are fixedly interconnected with four fixation bolts 34. Furthermore, the second main body block 30b is fixed to the first main body block 30a with two fixation bolts 35.

Moreover, respectively, the laminar flow element 2d of the thermal type flow sensor 2 is fixedly installed on the internal left side surface of the third main body block 30c, the pressure sensor 5 is fixedly installed on the bottom surface of the third main body block 30c, the pressure sensor 17 is fixedly installed on the top surface side of the fourth main body block 30d, the sensor circuit 2b of the thermal type flow sensor 2 and the control unit 7 are fixedly installed on the top surface side of the third main body block 30c, the drive unit 3a of the control valve 3 is fixedly installed on the top surface side of the first main body block 30a, the prefilter 29 is fixedly installed between the first main body block 30a and the second main body block 30b, and the orifice 6 is fixedly installed in the third main body block 30c.

In the same way, respectively, the inlet side passage 8 is formed in the first main body block 30a, the fluid passage 10 is formed in the first main body block 30a and the third main body block 30c, and the outlet side passage 9 is formed in the fourth main body block 30d and, in particular, the inner diameters and the lengths of the fluid passage 10 are selected so as to keep the internal volumes to the minimum necessary. Furthermore, a housing hole 2e' for the sensor pipe 2e and a housing hole 4a for the temperature sensor 4 are respectively drilled in the third main body block 30c. In addition, although not shown in FIG. 21, as a matter of course, the respective main body blocks 30a to 30d, and the respective main body blocks and the laminar flow element 2d and the orifice 6, are interconnected to each other in an airtight manner via sealing materials.

With the structure in which the plurality of main body blocks 30a to 30d are interconnected and combined to form the body 30 as described above, it is possible to considerably reduce the internal volumes of the fluid passage 10, and it is possible to compactly install the laminar flow element 2d, the pressure sensor 5, the orifice 6, and the like in the body 30. This structural configuration makes it possible to downsize the pressure type flow control system 1 with flow monitoring, and considerably reduce the level of transient overshoot of a sensing flow rate in the thermal type flow monitoring unit 1b.

Figure 19:
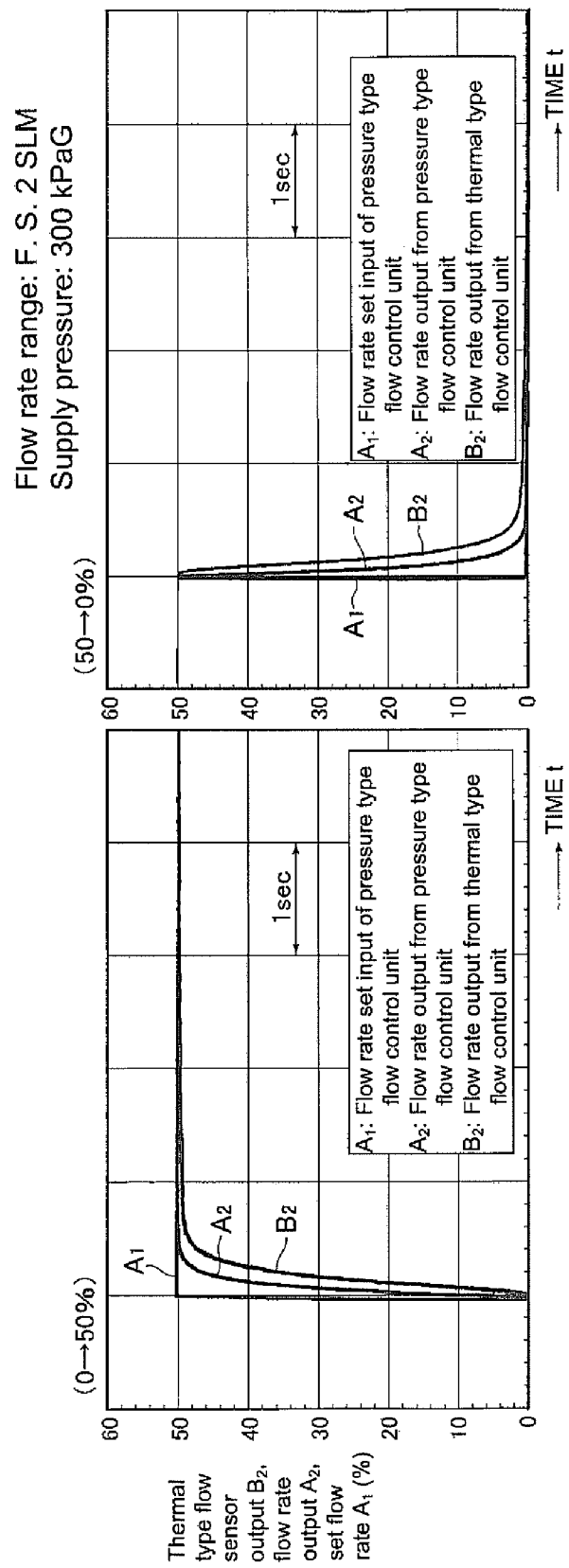
FIG. 19 shows an example of response characteristics of the pressure type flow control system with flow monitoring at a flow rate volume of 2000 SCCM, and shows a flow rate set value $A_1$ in the case where the flow rate setting is set from 0% to 50, and back to 0%, a flow rate output $A_2$, and a monitoring flow rate output $B_2$ of the thermal type flow sensor.
Figure 20:
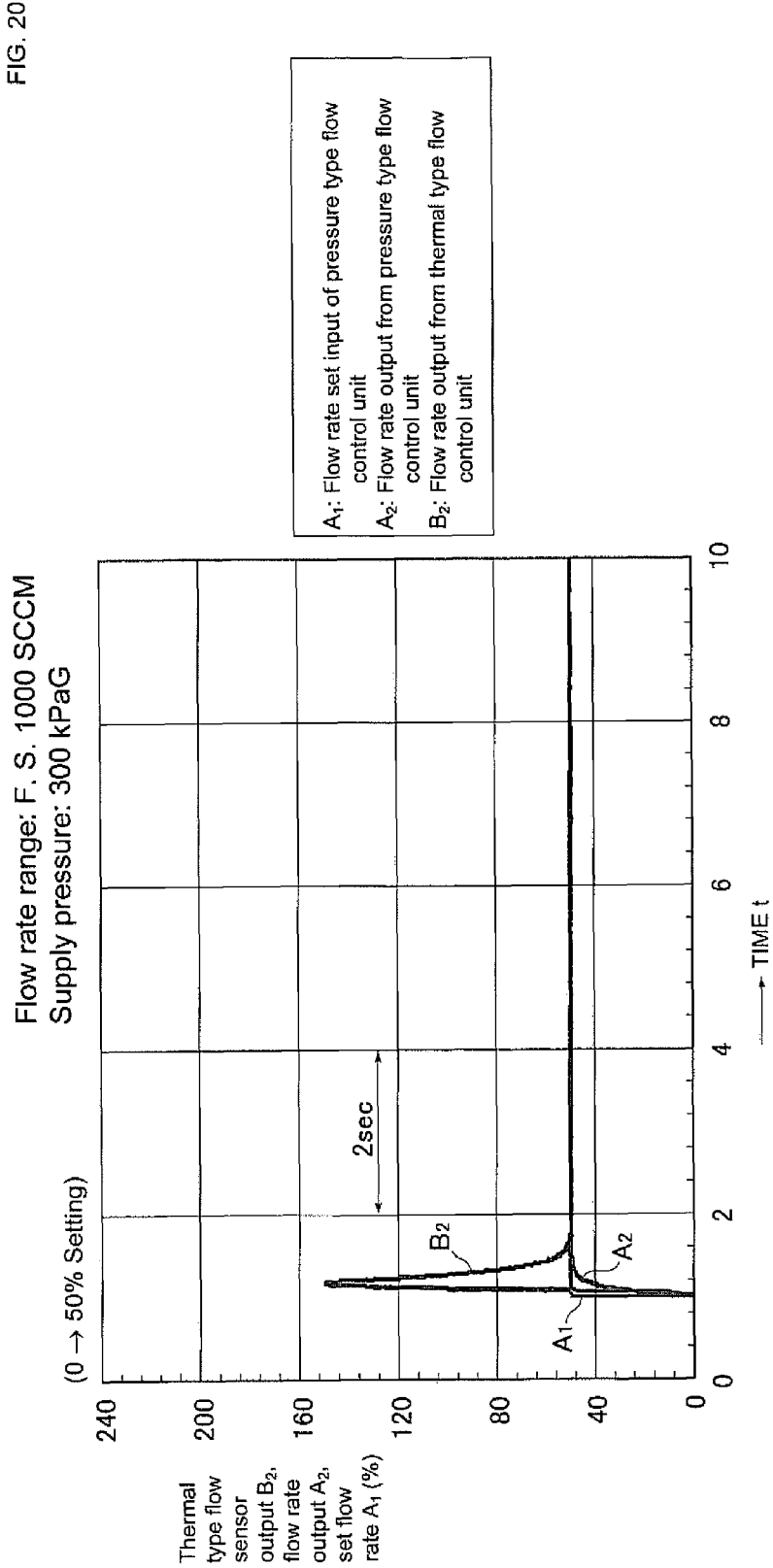
FIG. 20 shows an example of response characteristics of the pressure type flow control system with flow monitoring at a flow rate volume of 100 SCCM, and shows the case where the flow rate setting is set to 0% to 50%.

Transient overshoot of the monitoring flow rate (i.e., a flow rate output $B_2$ from the thermal type flow sensor 2) shown in FIG. 19 and FIG. 20, and the like, is ascribed as a cause for generating a difference between the monitoring flow rate output $B_2$ and the flow rate output $A_2$ from the pressure type flow control unit 1a, which causes a decrease in the flow control accuracy and the responsive performance of the pressure type flow control system 1 provided with flow monitoring. Therefore, it is necessary to make an overshoot of the flow rate output $B_2$ in the thermal type flow monitoring unit 1b (a flow rate output $B_2$ from the thermal type flow sensor 2) as small as possible, in order to decrease the difference between the monitoring flow rate output $B_2$ and the flow rate output $A_2$ in the pressure type flow control unit 1a.

Then, in accordance with the present invention, in order to decrease the difference between the monitoring flow rate output $B_2$ caused by the overshoot in the fluid passage 10 of FIG. 1 and the flow rate output $A_2$, a gradient $\Delta P/\Delta t$ of control pressure in the fluid passage 10 when the overshoot is caused is detected according to the rate of change in the flow rate output $A_2$ from the pressure type flow control unit 1a, and a detection value $B_2$ as the flow rate output from the thermal type flow sensor 2 is corrected by use of the gradient $\Delta P/\Delta t$ of the control pressure, thereby decreasing the difference between the flow rate output $B_2$ from the thermal type flow monitoring unit 1b (the flow rate output $B_2$ from the thermal type flow sensor 2) and the flow rate output $A_2$ from the pressure type flow control unit 1a, to further improve the monitoring flow rate accuracy.

Referring to FIG. 1, assuming that the flow rate of a fluid currently flowing in the fluid passage 10 in the system main body is $F_1$, the fluid flow rate $F_1$ becomes a fluid flow rate $B_2$ to be detected by the thermal type flow sensor 2. Furthermore, assuming that the flow rate of the fluid flowing in the passage on a downstream side of the orifice 6 (i.e., the outlet side passage 9) is $F_2$, the fluid flow rate $F_2$ becomes a fluid controlled flow rate $A_2$ in the pressure type flow control unit 1a.

That is, because the controlled flow rate $F_2$ of the pressure type flow control unit 1a is to be computed by $F_2=KP_1$ (K=a constant, $P_1$=pressure on the upstream side of the orifice 6), the above-described difference between the flow rates $F_1-F_2$ is proportional to the rate of increase in control pressure in the fluid passage 10 (i.e., the rate of increase in the flow rate output $A_2$ from the pressure type flow control unit 1a).

As a result, according to $F_1-F_2 \propto \Delta P/\Delta t$, it is possible to express $F_2=F_1-C\,(\Delta P/\Delta t)$ (however, C is a factor for converting the rate (pace) of increase in control pressure into a flow rate) and, in principle, it is possible to convert the flow rate $F_1$ to the flow rate $F_2$ according to ($\Delta P/\Delta t$). In addition, in the case of a stationary state (that is, there is no increase in pressure in the fluid passage 10 and the control pressure is constant), $\Delta P/\Delta t=0$ and $F_1-F_2=0$.

Figure 22:
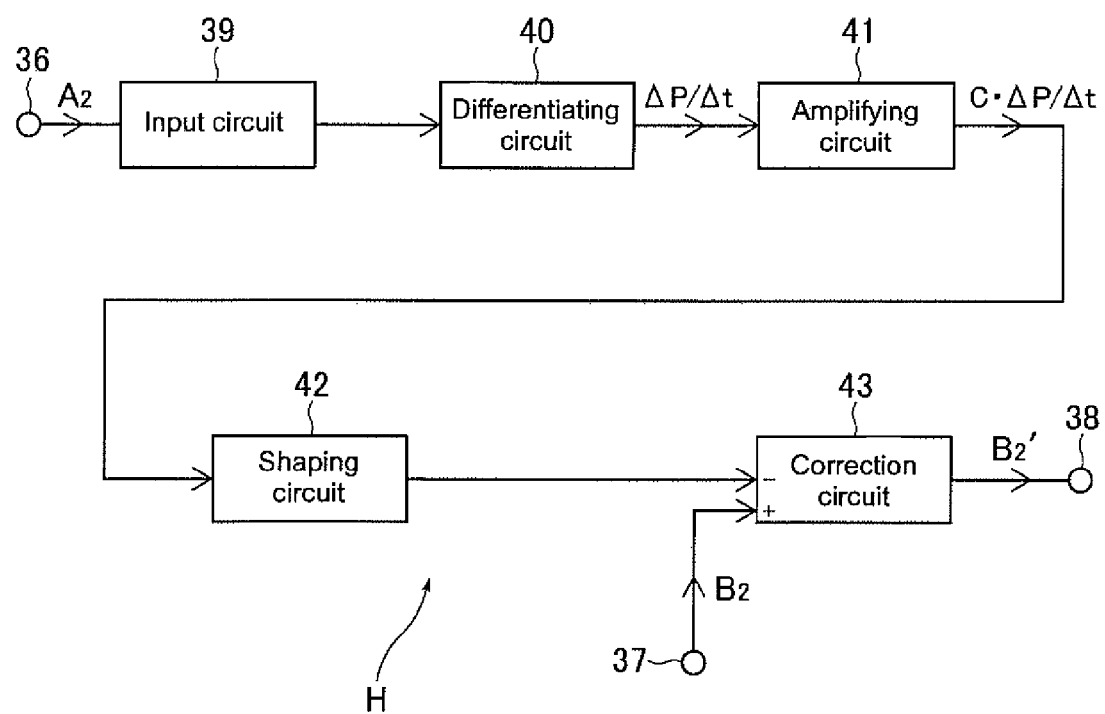
FIG. 22 is a schematic block configuration diagram of a monitoring flow rate output correction circuit of the thermal type flow sensor.

FIG. 22 is a block configuration diagram of the monitoring flow rate output correction circuit H of the thermal type flow sensor 2 for correcting the monitoring flow rate $B_2$ in the thermal type flow monitoring unit 1b. In FIG. 22, reference symbol 36 denotes an input terminal for the controlled flow rate output $A_2$ from the pressure type flow control unit 1a, reference symbol 37 denotes an input terminal for the monitoring flow rate output $B_2$ from the thermal type flow monitoring unit 1b, reference symbol 38 denotes an output terminal for the corrected monitoring flow rate output $B_2'$, reference symbol 39 denotes an input circuit, reference symbol 40 denotes a differentiating circuit, reference symbol 41 denotes an amplifying circuit, reference symbol 42 denotes a shaping circuit, and reference symbol 43 denotes a correction circuit.

The controlled flow rate output $A_2$ from the pressure type flow control unit 1a is input to the differentiating circuit 40 through the input circuit 39, and a rate of change in the controlled flow rate output $A_2$, i.e., the pace of change $\Delta P/\Delta t$ in control pressure P, is detected therein. Furthermore, a gradient (the rate of change) $\Delta P/\Delta t$ of the control pressure P is input to the amplifying circuit 41, to be amplified (by amplification factor C) therein, and is thereafter shaped into a waveform matching the monitoring flow rate output $B_2$ from the thermal type flow monitoring unit 1b input from the input terminal 37 so as to be, thereafter, input to the correction circuit 43 formed of a differential amplifier. Moreover, in the correction circuit 43, the corrected flow rate $C \cdot \Delta P/\Delta t$ input from the shaping circuit 42 is subtracted from the monitoring flow rate output $B_2$ from the thermal type flow sensor 2, and the corrected monitoring flow rate output $B_2'$ is output from the corrected output terminal 38.

Figure 23:
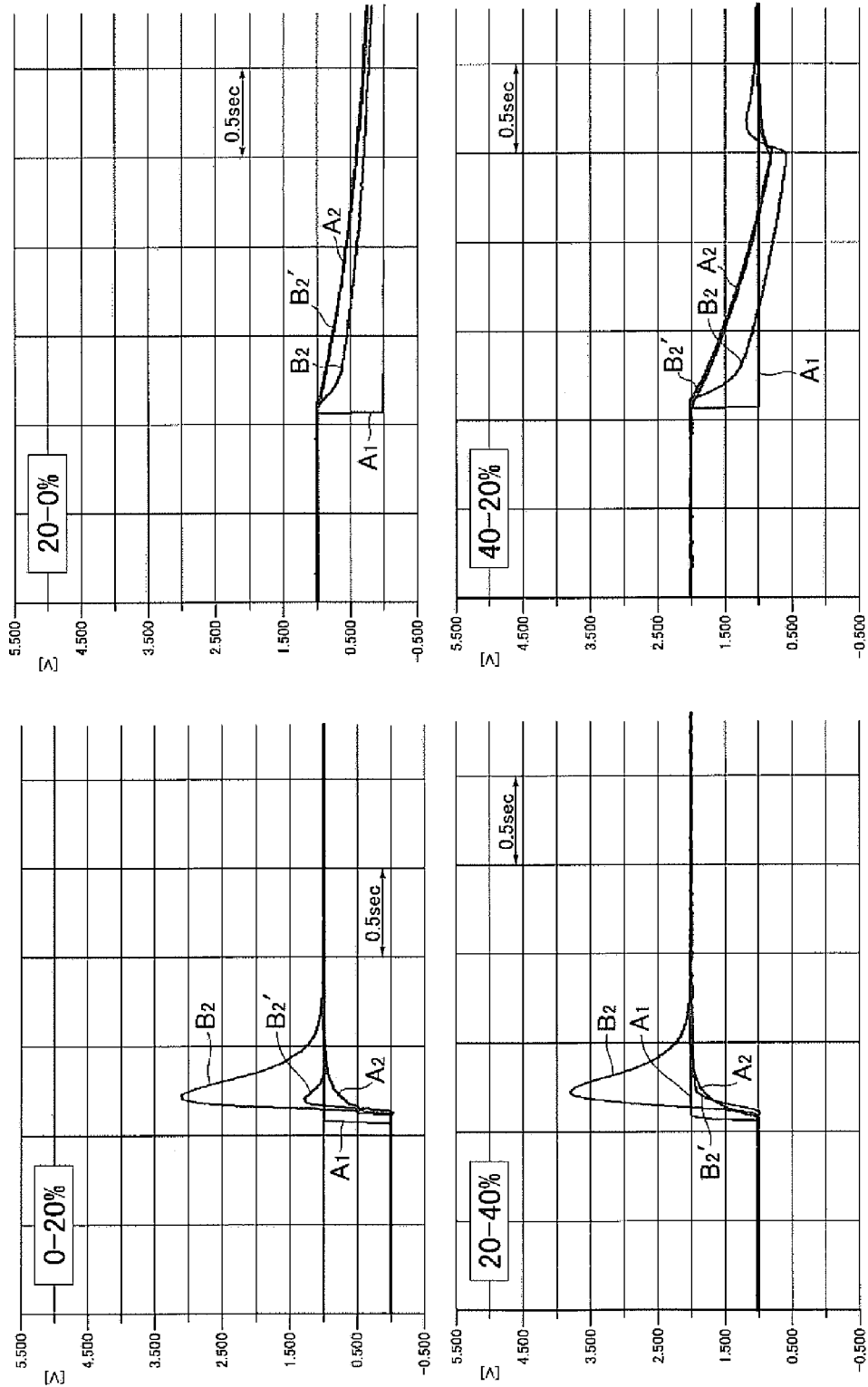
FIG. 23 shows an example of response characteristics of the system using the monitoring flow rate output correction circuit H in the case where a flow rate volume is 100 SCCM and $N_2$ gas supply pressure is 300 kPaG (0%≥20%→0% and 20%→40%→20%).
Figure 24:
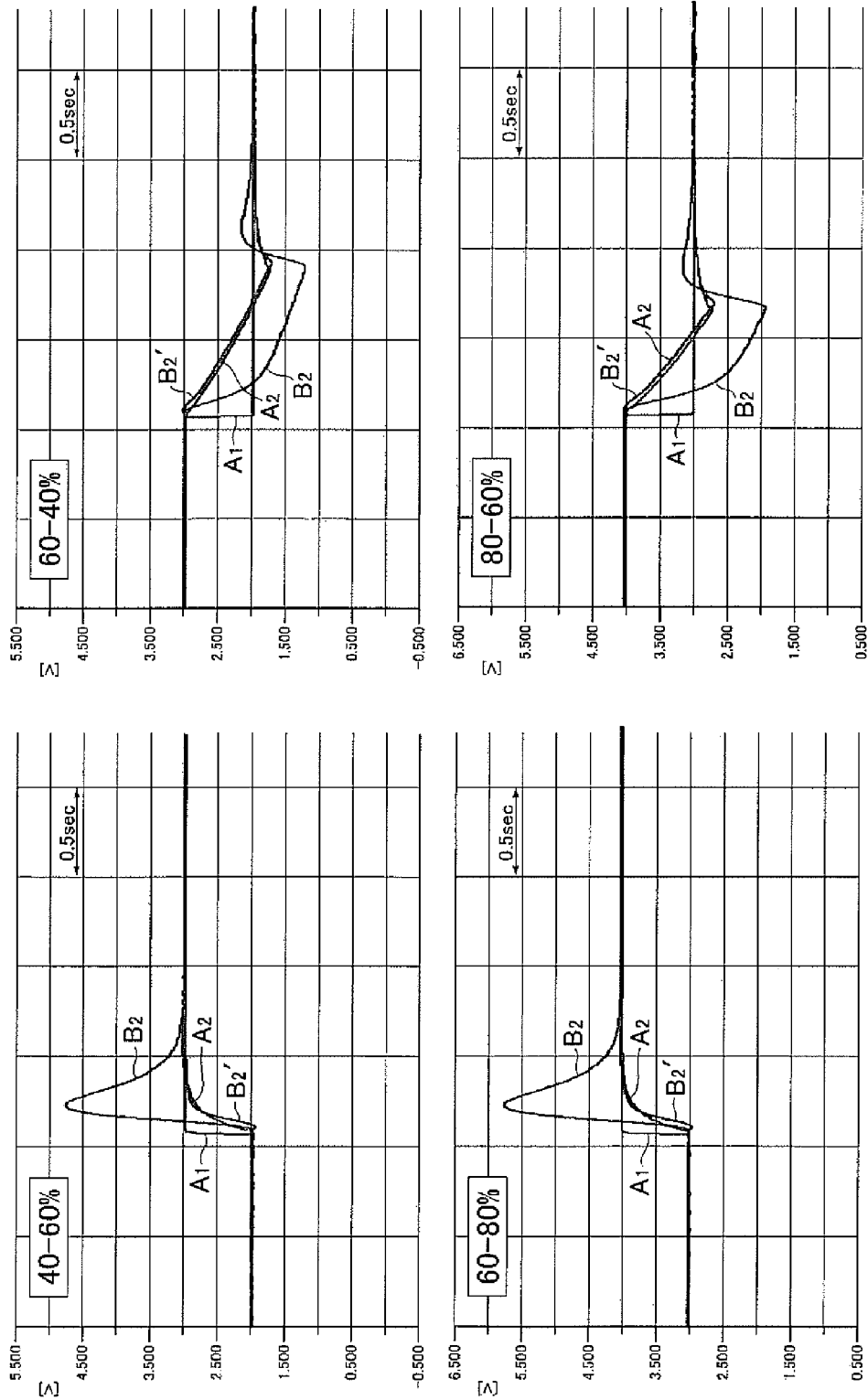
FIG. 24 shows response characteristics at 40%→60%→40% and 60%→80%→60% in the system of FIG. 23.

FIG. 23 to FIG. 25 show the results of response characteristics tests under the condition of $N_2$ gas supply pressure of 300 kPaG of the pressure type flow control system 1 with flow monitoring at a flow rate volume of 100 SCCM, using the monitoring flow rate output correction circuit H shown in FIG. 22. In addition, in FIG. 23 to FIG. 25, reference symbol $A_1$ denotes a set input of the pressure type flow control unit $1a$, reference symbol $A_2$ denotes a controlled flow rate output from the pressure type flow control unit $1a$, reference symbol $B_2$ denotes a monitoring flow rate output from the thermal type flow monitoring unit $1b$, and reference symbol $B_2'$ denotes a corrected monitoring flow rate output from the thermal type flow monitoring unit $1b$.

As is clear from FIG. 23 to FIG. 25 as well, the controlled flow rate output $A_2$ from the pressure type flow control unit $1a$ and the corrected monitoring flow rate output $B_2'$ of the monitoring flow rate output $B_2$ from the thermal type flow monitoring unit $1b$ show the approximate response characteristics at the time both of starting-up and closing-down the system. In other words, by using the monitoring flow rate output correction circuit H according to the present invention, even when overshoot is caused in the monitoring flow rate output $B_2$, it is possible to eliminate the influence of the overshoot with comparative ease, to obtain a highly accurate monitoring flow rate output $B_2'$ with high response characteristics.

Figure 26:
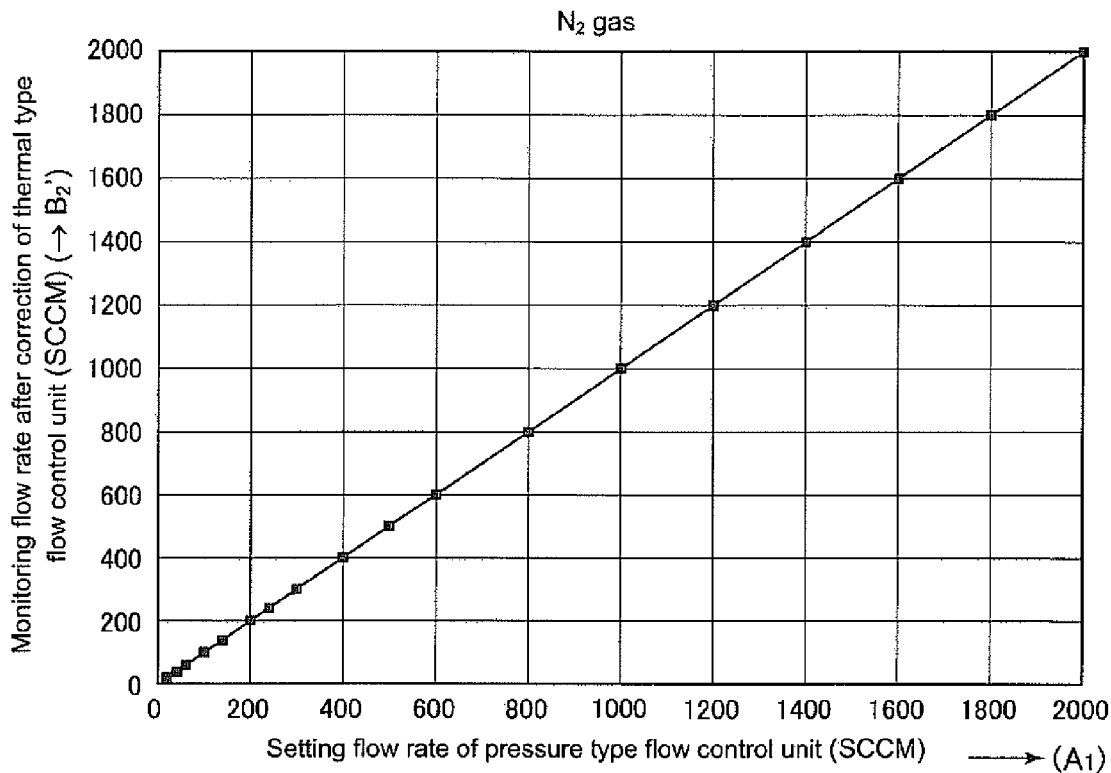
FIG. 26 is a line graph showing flow control characteristics with respect to a $N_2$ gas of the pressure type flow control system with flow monitoring at a flow rate volume of 2000 SCCM in which the monitoring flow rate output correction circuit H is provided.
Figure 27:
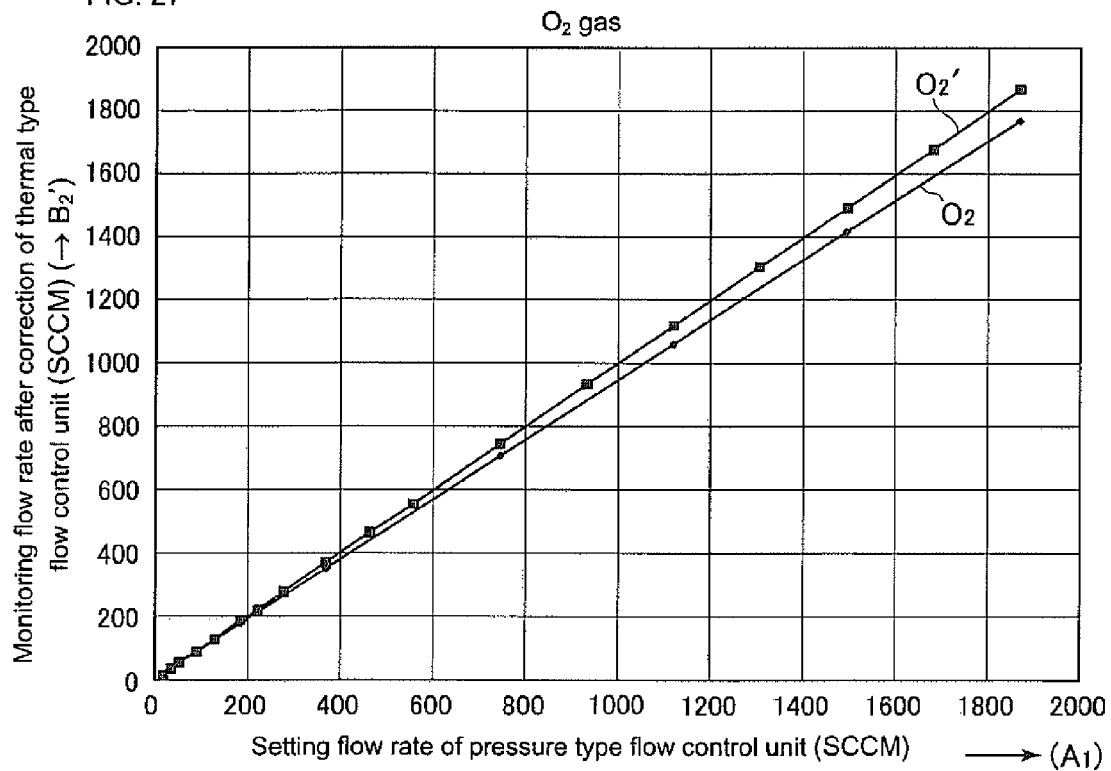
FIG. 27 shows flow control characteristics in the case where the gas type is an $O_2$ gas in the pressure type flow control system with flow monitoring, and corrected flow control characteristics in consideration of a conversion factor (C. F.) of the gas type.
Figure 28:
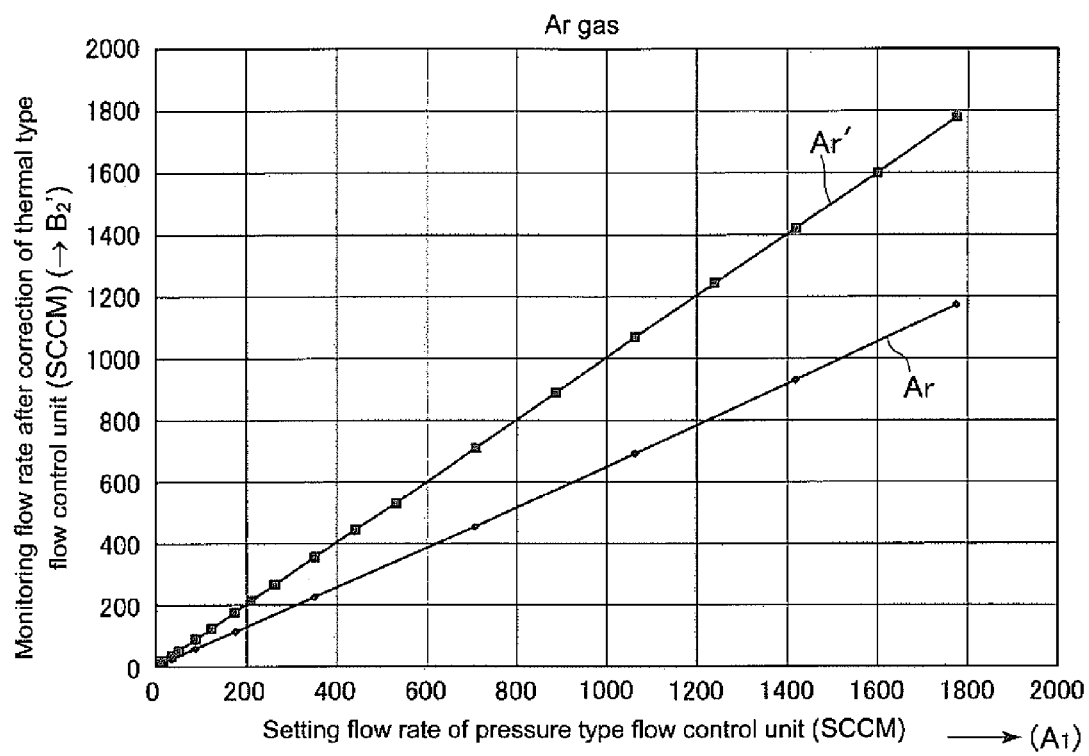
FIG. 28 shows flow control characteristics in the case where the gas type is an Ar gas, and corrected flow control characteristics in consideration of a conversion factor (C. F.) of the gas type.

In the pressure type flow control system 1 with flow monitoring as well, when the gas type of the control fluid is changed, it is necessary to correct the flow control characteristics relating to a so-called conversion factor (C. F.) in the same way as in the case of a conventional pressure type flow control system. FIG. 26 to FIG. 28 show the relationship between the monitoring flow rate output $B_2$ and the corrected monitoring flow rate output $B_2'$, and the set flow rate $A_1$ of the pressure type flow control unit $1a$, in the case where the gas type of the control fluid is changed in the pressure type flow control system 1 with flow monitoring at a flow rate volume of 2000 SCCM in which the monitoring flow rate output correction circuit H shown in FIG. 22 is provided. Furthermore, calibration of the flow rate is carried out with a $N_2$ gas serving as a standard, and the gas supply pressure is set to 300 kPaG in each case.

FIG. 26 shows the relationship between the corrected monitoring flow rate output $B_2'$ and the set flow rate $A_1$ of the pressure type flow control unit $1a$ with $N_2$ serving as a control fluid. As evident from FIG. 26, the set flow rate $A_1$ and the monitoring flow rate output $B_2'$ correspond to one another in a relationship of 1:1.

In contrast thereto, FIG. 27 and FIG. 28 show the case where the control fluid is $O_2$ and Ar, respectively. As shown by FIG. 27, when the control fluid is $O_2$ in the pressure type flow control system 1 with flow monitoring, in which calibration is carried out with $N_2$ serving as a control fluid, and which has the flow characteristics shown in FIG. 26, the flow control characteristics become like the straight line $O_2$. Therefore, in order to contrast the monitoring flow rate output $B_2'$ with the set flow rate $A_1$ in 1:1, it is necessary to again correct the flow control characteristics for $O_2$ to be like the straight line $O_2'$.

In the same way in the case where the control fluid is Ar, because the flow control characteristics becomes like the straight line Ar, as shown in FIG. 28 where the control fluid is Ar, in order to contrast the monitoring flow rate $B_2'$ with the set flow rate $A_1$ in 1:1, it is necessary to correct the flow characteristics Ar to be like the straight line Ar', in consideration of a conversion factor (C.F) of the gas type between $N_2$ and Ar.

Next, an initial value memory of a thermal type flow sensor output before actual use of the pressure type flow control system 1, with flow monitoring, according to the present invention will be described. The pressure type flow control unit $1a$ and the thermal type flow monitoring unit $1b$ of the pressure type flow control system 1 with flow monitoring are the same as in the case of the conventional pressure type flow control system with respect to the fact that it is necessary to execute a so-called "flow rate self-diagnosis" at the time of actual use of the system 1, in order to check whether or not there is a difference between the monitoring flow rate and the real fluid flow rate.

Therefore, in the pressure type flow control system 1 with flow monitoring of the present invention as well, in the case where this system 1 is attached to a gas supply system pipe, or the like, first, it is necessary to memorize the relationship between the set flow rate value and the flow rate output value of the thermal type flow monitoring unit $1b$ in an initial stage of supply of the live gas (hereinafter called a "live gas monitoring flow rate output initial value memory"). As a matter of course, it is necessary to convert a live gas flow rate output of the pressure type flow control unit $1a$ as well. However, because this is already publicly known, explicit descriptions of such a conversion are omitted here. However, such a conversion is disclosed by U.S. Pat. No. 5,669,408, and by U.S. Pat. No. 5,791,369, and by U.S. Pat. No. 5,816,285 and others, which are incorporated herein by reference for all it discloses.

Figure 29:
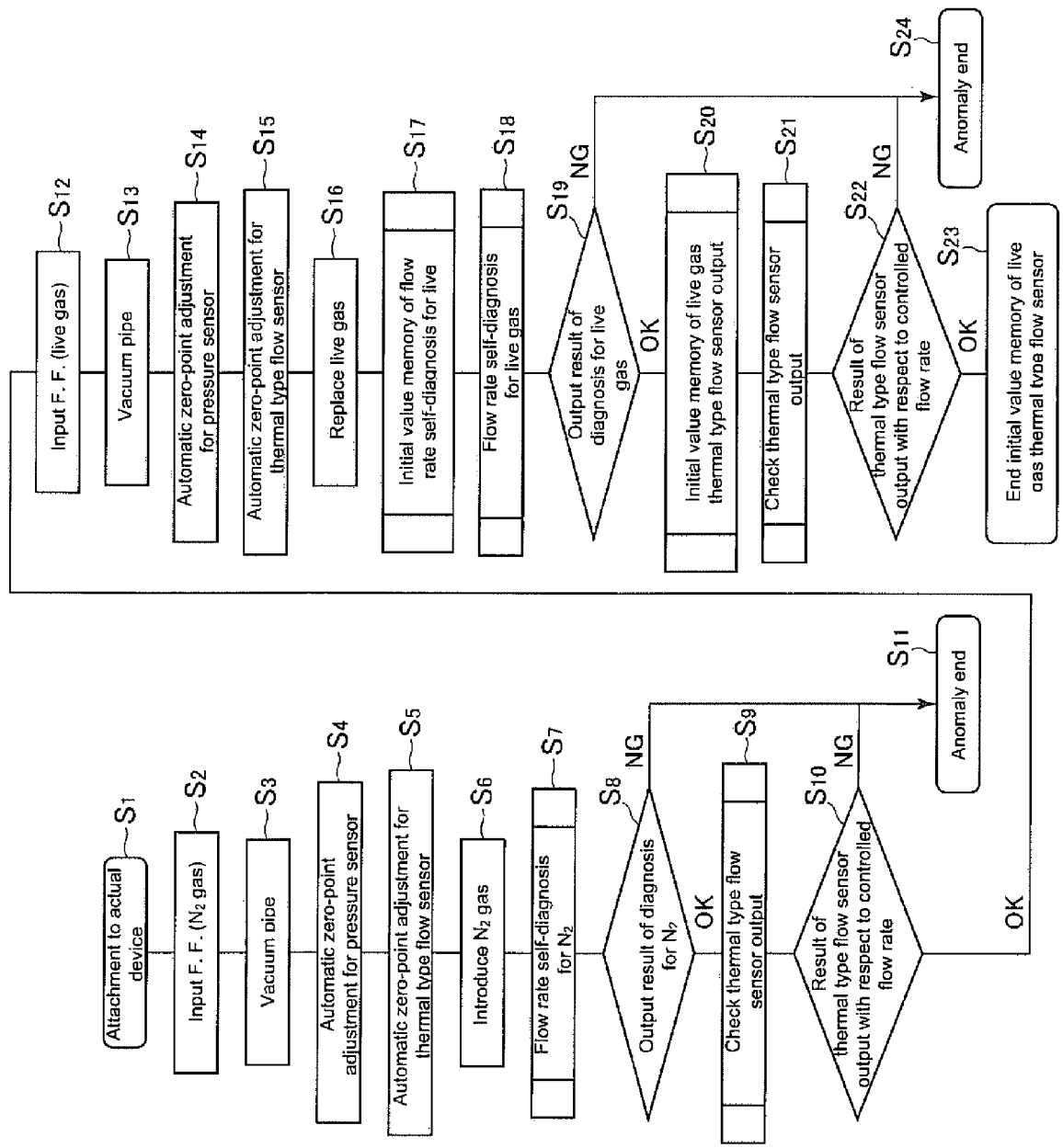
FIG. 29 is a process flowchart for initial value memory of a thermal type flow sensor flow rate output with respect to a live gas.

The live gas monitoring flow rate output initial value memory of the thermal type flow monitoring unit $1b$ is carried out following the process flow as shown in FIG. 29. First, the relationship of the flow rate output $B_2$ from the thermal type flow sensor 2 with the controlled flow rate $A_1$ of the system 1 is checked by use of a $N_2$ gas. Thereafter, the flow rate output $B_2$ from the thermal type flow sensor 2 to be memorized, with respect to the controlled flow rate $A_1$ in the case where a live gas is supplied, is checked.

Referring to FIG. 29, first, after attachment to actual equipment (Step $S_1$), a flow factor F. F. value of $N_2$ is input to the pressure type flow control unit $1a$ (Step $S_2$), to vacuum-exhaust the $N_2$ gas in the pipe passage (Step $S_3$). Thereafter, an automatic zero-point adjustment of the pressure sensor $P_1$ (Step $S_4$) and an automatic zero-point adjustment of the thermal type flow sensor 2 (Step $S_5$) are performed, and the $N_2$ gas is supplied to the inside of the pipe passage (Step $S_6$), to perform the flow rate self-diagnosis for the $N_2$ gas (Step $S_7$). Moreover, the result of the flow rate self-diagnosis for the $N_2$ gas is determined in Step $S_8$, and when the result of the flow rate self-diagnosis is within a range of allowable values, the flow rate output $B_2$ from the thermal type flow sensor 2 is checked in Step $S_9$, and the flow rate output $B_2$ with respect to the controlled flow rate $A_1$ is checked in Step $S_{10}$, and when a difference between them both is within the range of allowable values, the process flow with the $N_2$ gas is terminated, so as to proceed to the process flow with a live gas in Step $S_{12}$. Furthermore, in the case where the result of the self-diagnosis in Step $S_8$ is out of the range of allowable values, it is judged that the system 1 is abnormal, which results in termination of the process flow in Step $S_{11}$.

When the process flow with the $N_2$ gas is terminated, a flow factor F. F. value of the live gas is input to the pressure type flow control unit $1a$ (Step $S_{12}$), and vacuuming of the inside of the pipe (Step $S_{13}$), an automatic zero-point adjustment of the pressure sensor 5 (Step $S_{14}$), and an automatic zero-point adjustment of the thermal type flow sensor 2 (Step $S_{15}$) are performed. Thereafter, the live gas is supplied into the pipe passage (Step $S_{16}$) to perform the initial value memorization in the flow rate self-diagnosis for the live gas in Step $S_{17}$. The initial value memorization in Step $S_{17}$ is performed by a memory unit $7c$ of the control unit 7 so that an initial value memory is obtained and memorized in the memory unit $7c$ as described above (See, e.g., paragraph [0098]). In addition, the initial value memory is the result of a process for memorizing the pressure drop characteristics in an initial stage of supply in the case where a live gas is supplied, and furthermore, the flow rate self-diagnosis for the live gas in Step $S_{19}$ is employed to check the pressure drop characteristics memorized in Step $S_{17}$.

It is judged whether or not a difference between the pressure drop characteristics at the initial value memorized and at the diagnosis is within a range of allowable values by the flow rate self-diagnosis for the live gas in Step $S_{18}$ (Step $S_{19}$). When the difference is within the range of allowable values, the initial value memorization of the flow rate output from the thermal type flow sensor 2 is carried out in Step $S_{20}$, and next, the flow rate output $B_2$ from the thermal type flow sensor 2 is checked in Step $S_{21}$, and the corrected value $B_2'$ of the monitoring flow rate $B_2$ from the thermal type flow sensor with respect to the controlled flow rate $A_2$ is checked (Step $S_{22}$). When the difference is within the range of allowable values, the initial value memory process of the thermal type flow sensor output with respect to the live gas is completed (Step $S_{23}$). Furthermore, when the result of the flow rate self-diagnosis for the live gas in Step $S_{19}$ is out of the range of allowable values, the process flow is discontinued because it is judged that the system 1 is abnormal (Step $S_{24}$).

The processing of the initial value memory of a thermal type flow sensor flow rate output in Step $S_{20}$ is, specifically, as shown in FIG. 30(a), which ultimately results in memorization of the correction value by the memory unit $7c$. Thus, as shown in FIG. 30(a), flow control is executed at respective flow rate set values $A_1$, and a corrected value $B_2'$ is automatically calculated from an output value $B_2$ from the thermal type flow sensor at each of the respective flow rate set values $A_1$, until memorization of the final correction value (i.e., the correction value memory). In addition, latency times t at the respective flow rate set values $A_1$ and the respective set values are memorized in the memory unit $7c$ of system 1 in advance of factory shipment. In the example of FIG. 30(a), the flow control set values $A_1$ are set to 25%, 50%, 75% and 100%, and the latency time t is set to 10 seconds, and the monitoring flow rate $B_2$ of the thermal type flow sensor 2 is measured, and its corrected value $B_2'$ is calculated to be memorized by the memory unit $7c$.

Checking of the flow rate output $B_2$ from the thermal type flow sensor 2 from the thermal type flow sensor when the live gas is supplied in Step $S_{22}$ is performed in the same way. As shown in FIG. 30(b), flow control is executed at respective flow rate set values $A_1$, and a thermal type flow sensor output $B_2$ is measured after the elapse of a predetermined latency time, and a sensor flow rate output $B_2'$ that the output $B_2$ is corrected is output, in order to compare it with the controlled flow rate $A_1$. In addition, the respective set values $A_1$ of the pressure type flow control unit, and their scores, latency times t, reference values for check and determination, and the like are memorized by the memory unit $7c$ of the system 1 in advance of factory shipment. FIG. 30(b) shows the case where the controlled flow rate set values $A_1$ are set to 12%, 37%, 62% and 87% of the rating, and the latency time t is set to 10 seconds.

INDUSTRIAL APPLICABILITY

The present invention is widely applicable not only to gas supplying facilities for semiconductor manufacturing equipment, but also to fluid supply circuits for chemical product manufacturing equipment, and the like, as long as the present invention controls a flow rate of a fluid under the critical expansion conditions. Generally, the present invention provides a pressure type flow control system with flow monitoring that is capable of easily and precisely, and appropriately, monitoring a real flow rate of a control fluid in real time while making full use of the excellent flow control characteristics obtained by a pressure type flow control system using an orifice, and by adding a simple configuration. Thus, broadly constructed, the present invention pertains to a pressure type flow control system with flow monitoring that is composed of an inlet side passage 8 for fluid, a control valve 3 composing a pressure type flow control unit $1a$ that is connected to a downstream side of the inlet side passage 8, a thermal type flow sensor 2 that is connected to a downstream side of the control valve 3, an orifice 6 that is installed along the way of a fluid passage 10 communicatively connected to a downstream side of the thermal type flow sensor 2, a temperature sensor 4 that is provided near the fluid passage 10 between the control valve 3 and the orifice 6, a pressure sensor 5 that is provided for the fluid passage 10 between the control valve 3 and the orifice 6, an outlet side passage 9 that is communicatively connected to the orifice 6, and a control unit 7 that is composed of a pressure type flow rate arithmetic and control unit $7a$ to which a pressure signal from the pressure sensor 5 and a temperature signal from the temperature sensor 4 are input, and which computes a flow rate value Q of a fluid flowing through the orifice 6, and outputs a control signal Pd for bringing the control valve 3 into an opening or closing action in a direction in which a difference between the computed flow rate value and a set flow rate value is decreased, to a valve drive unit $3a$, and a flow sensor control unit $7b$ to which a flow rate signal $2c$ from the thermal type flow sensor 2 is input, and which computes a flow rate of the fluid flowing through the orifice 6 according to the flow rate signal $2c$, to indicate the actual flow rate.

DESCRIPTION OF REFERENCE SYMBOLS

Figure 6:
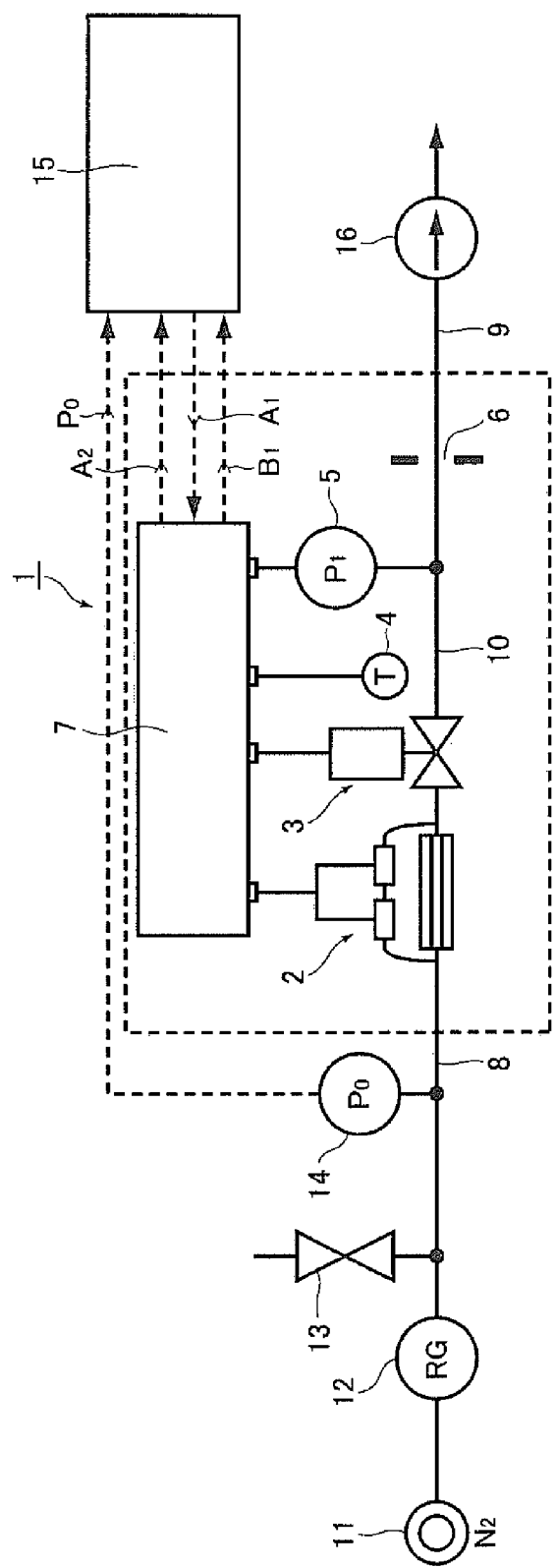
FIG. 6 is a first conception diagram of the pressure type flow control system with flow monitoring, which is conceived by the inventors of the invention of the present application.
Figure 7:
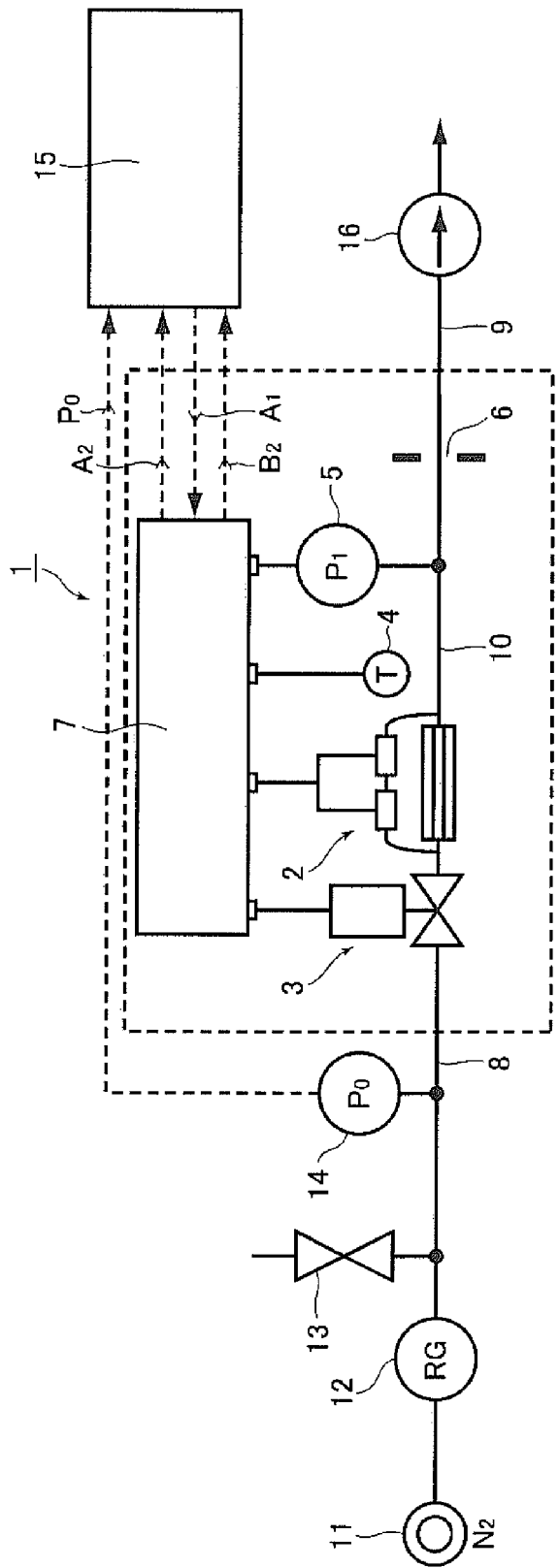
FIG. 7 is a second conception diagram of the pressure type flow control system with flow monitoring, which is conceived by the inventors of the invention of the present application.
Figure 8:
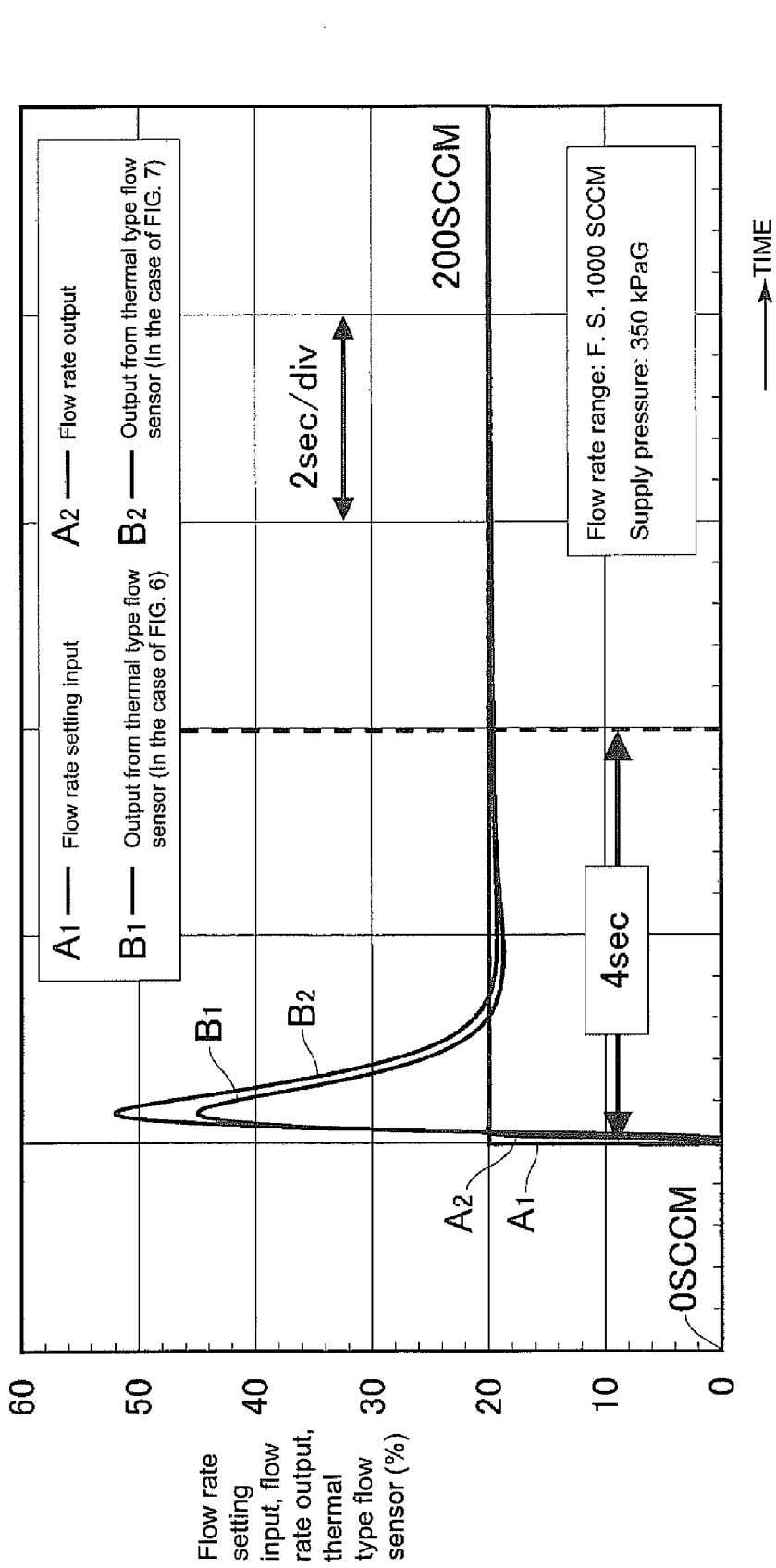
FIG. 8 shows curves of the step response characteristics of the thermal type flow sensor (in the case of a set flow rate of 20%).
Figure 9:
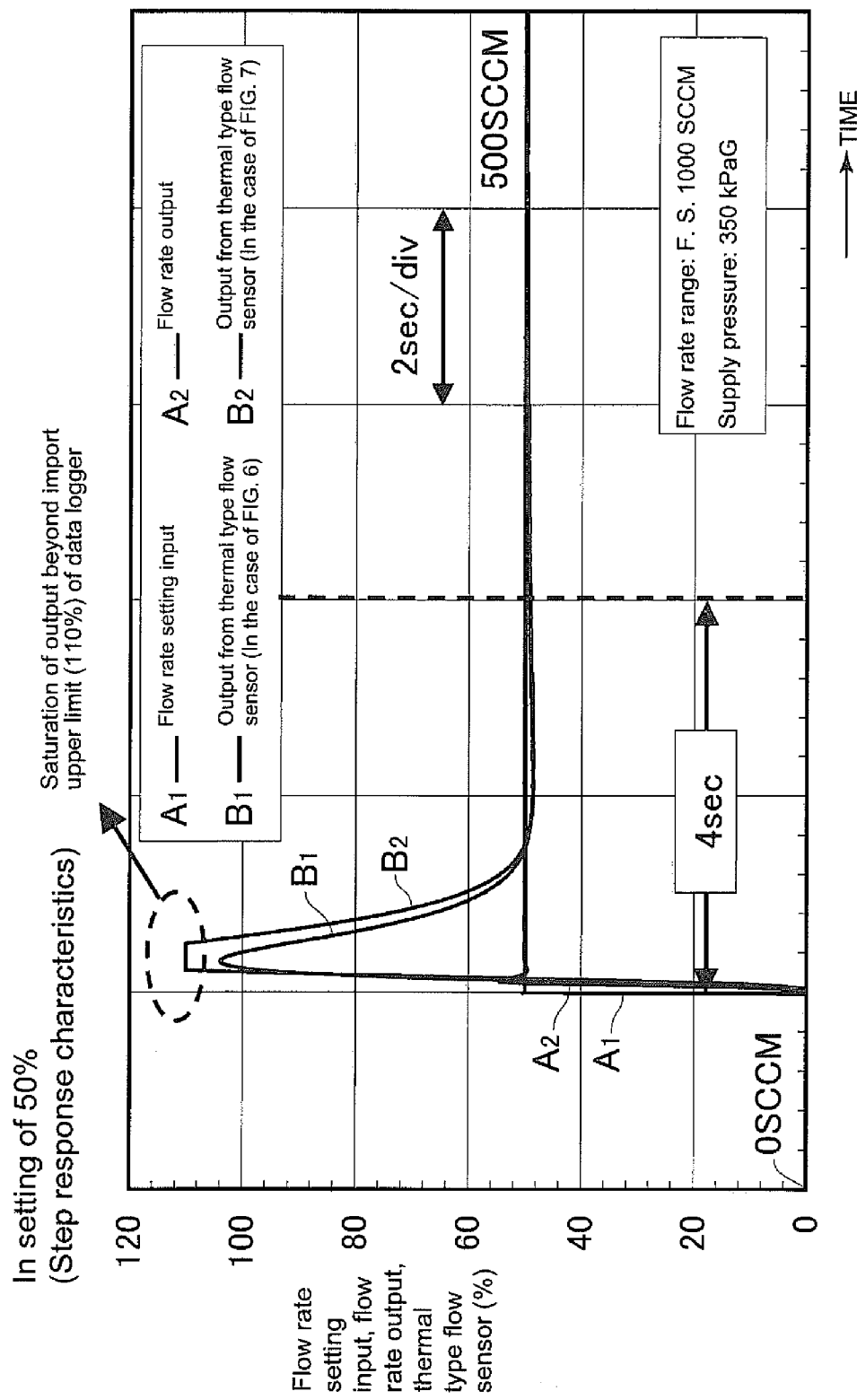
FIG. 9 shows curves of the step response characteristics of the thermal type flow sensor (in the case of a set flow rate of 50%).
Figure 10:
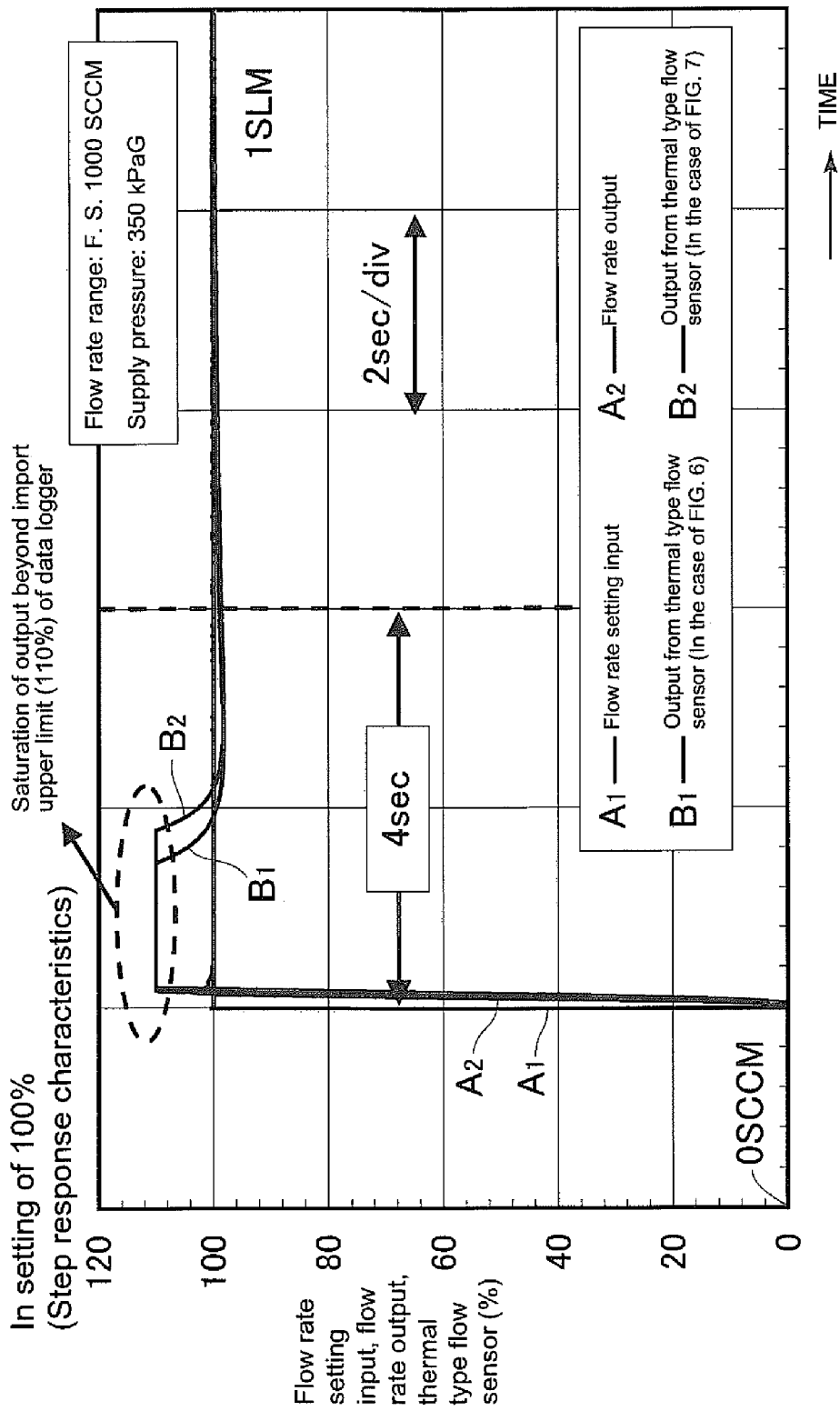
FIG. 10 shows curves of the step response characteristics of the thermal type flow sensor (in the case of a set flow rate of 100%).
Figure 11:
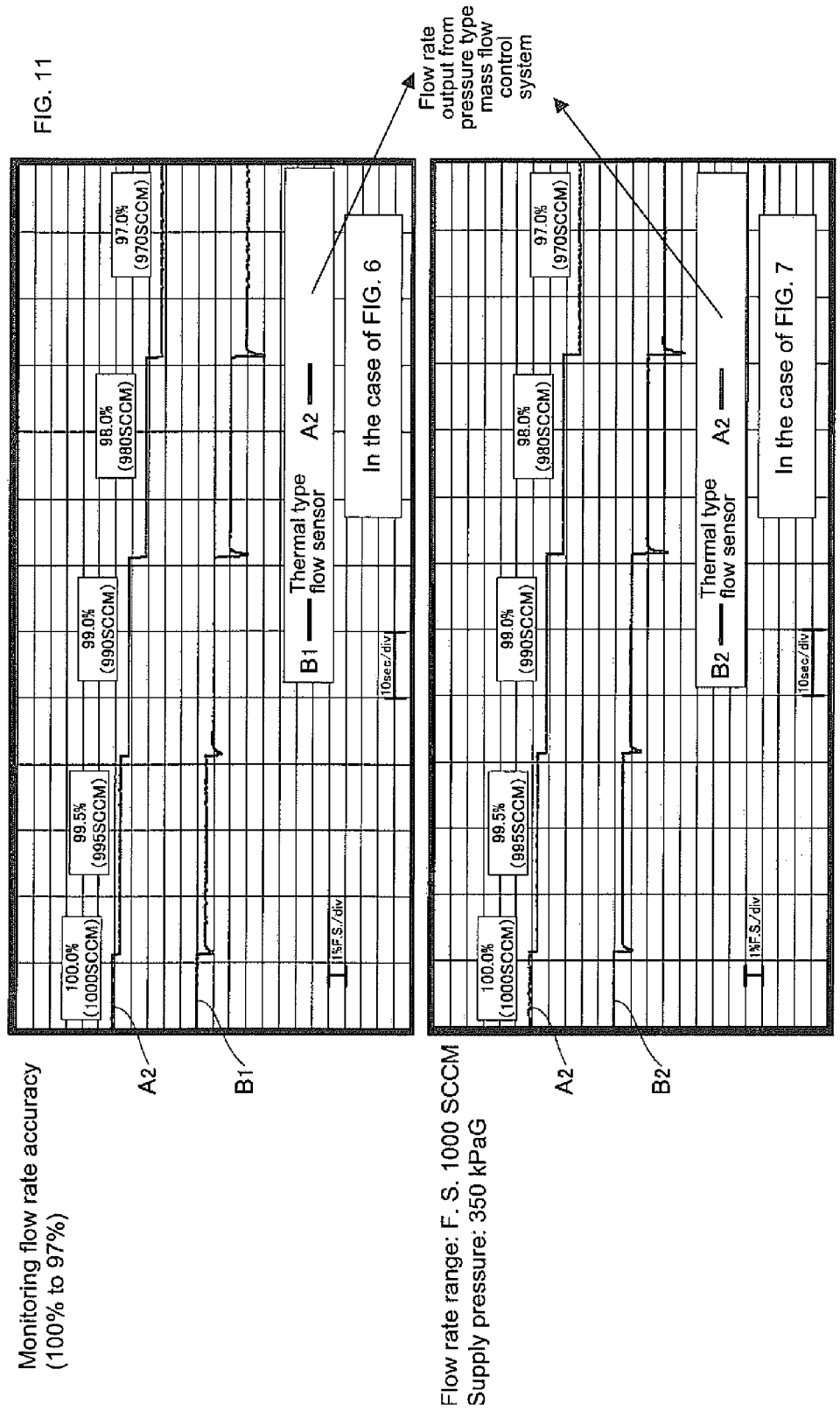
FIG. 11 shows curves of the monitoring flow rate accuracy characteristics of the thermal type flow sensor (in the case of a set flow rate of 100% to 97%).
Figure 12:
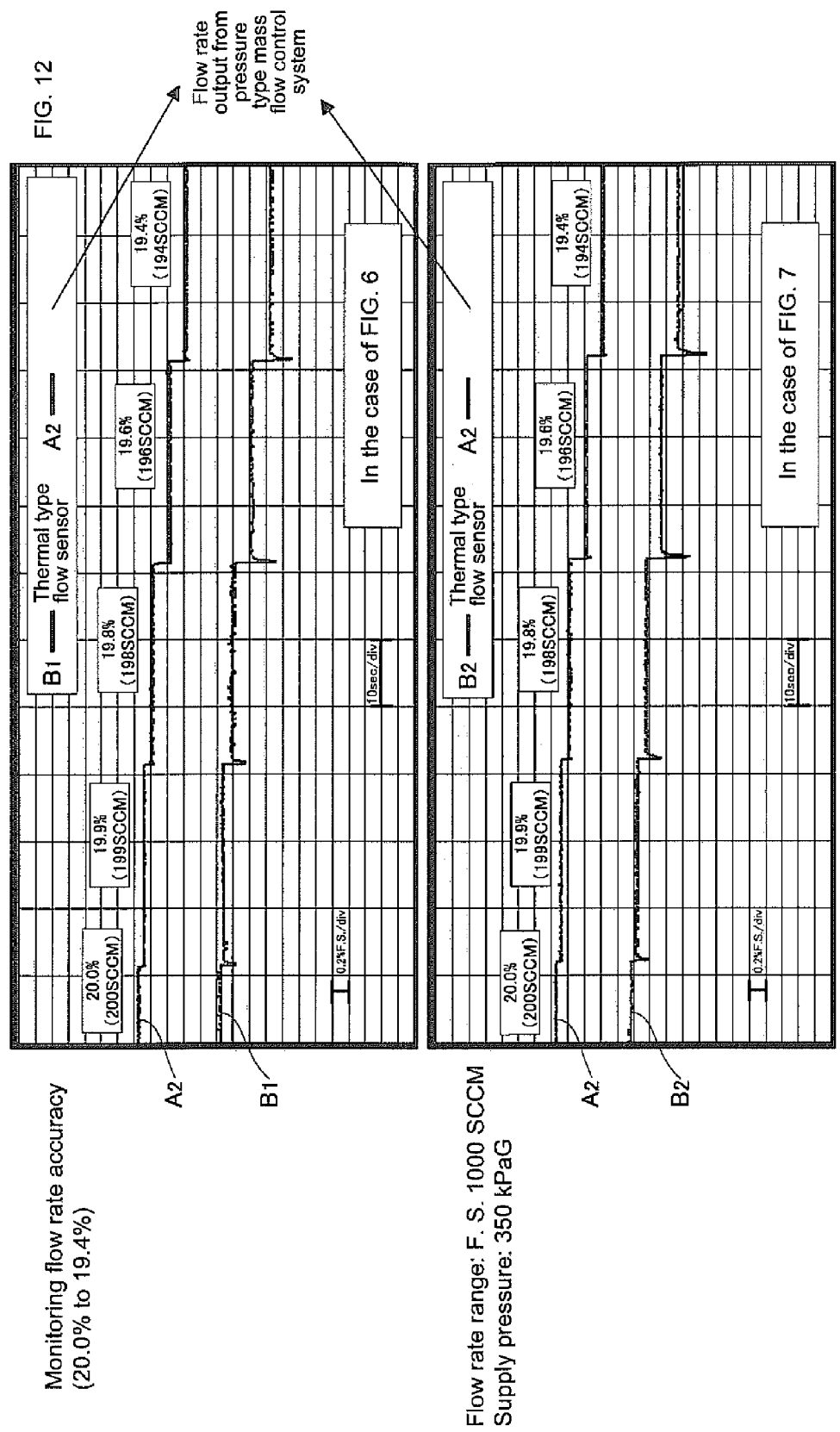
FIG. 12 shows curves of the monitoring flow rate accuracy characteristics of the thermal type flow sensor (in the case of a set flow rate of 20.0% to 19.4%).
Figure 13:
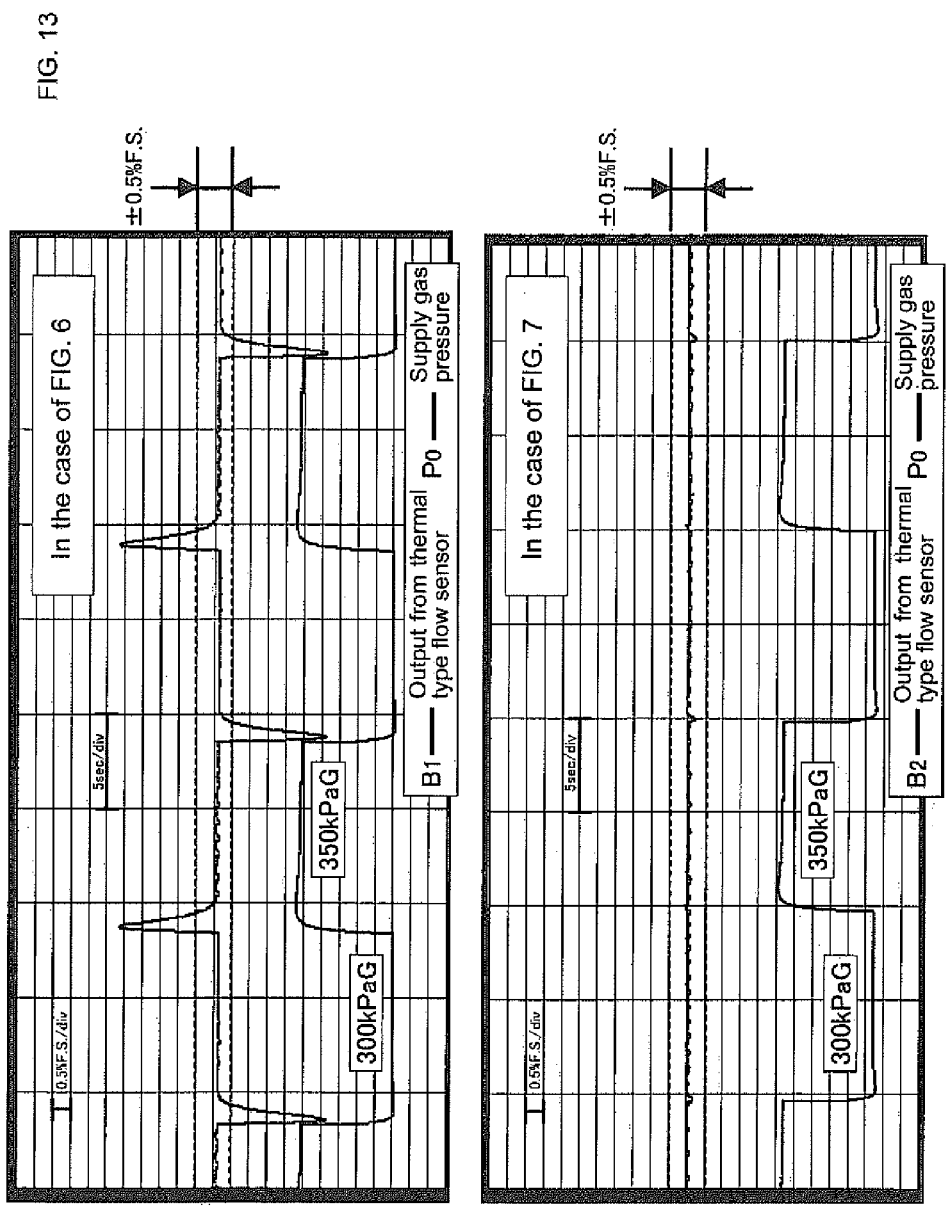
FIG. 13 shows curves of the supply pressure fluctuating characteristics of the thermal type flow sensor (in the case of a set flow rate of 50%).
Figure 14:
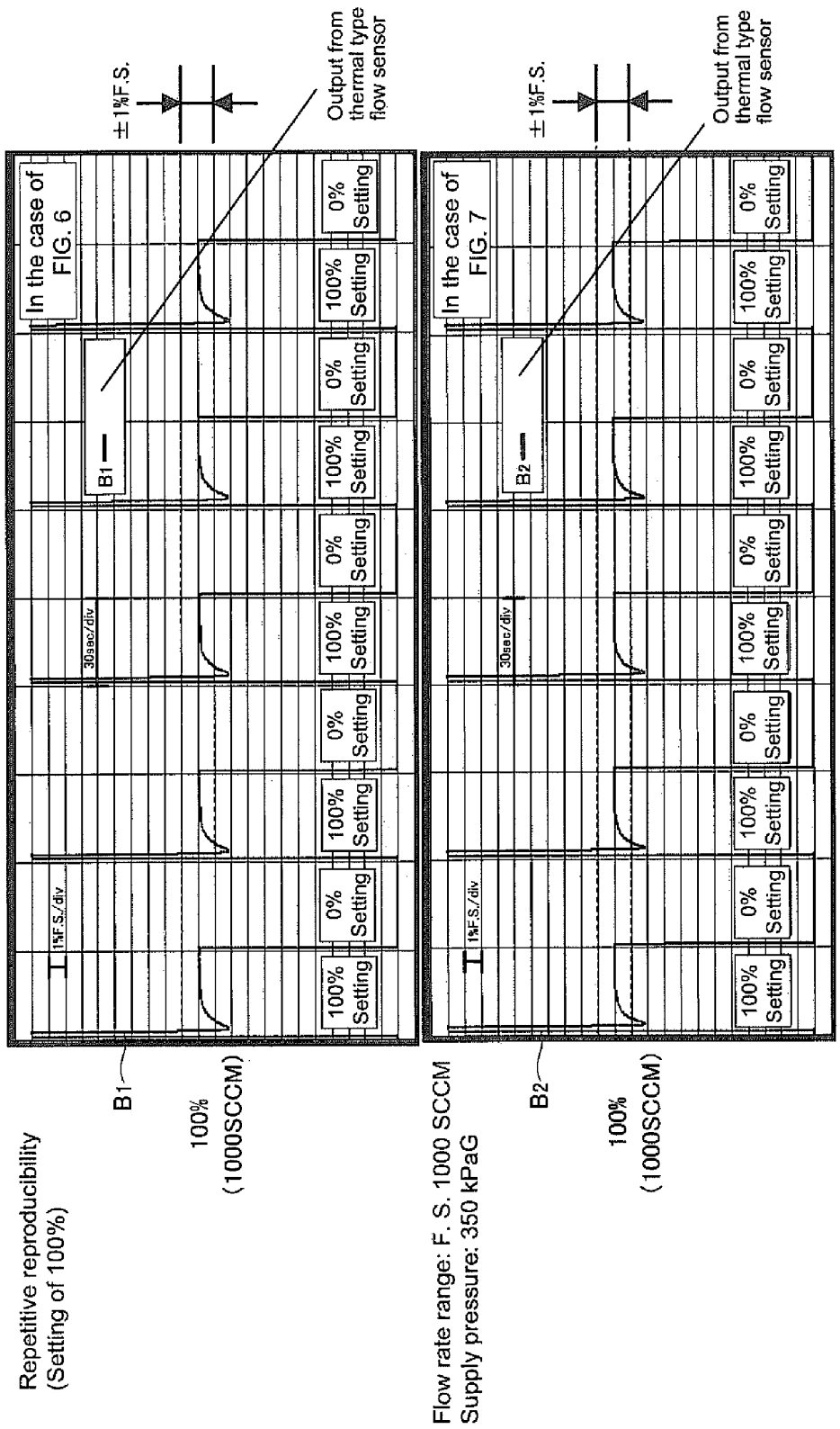
FIG. 14 shows curves of the repetitive reproducibility characteristics of the thermal type flow sensor (in the case of a set flow rate of 100%).
Figure 15:
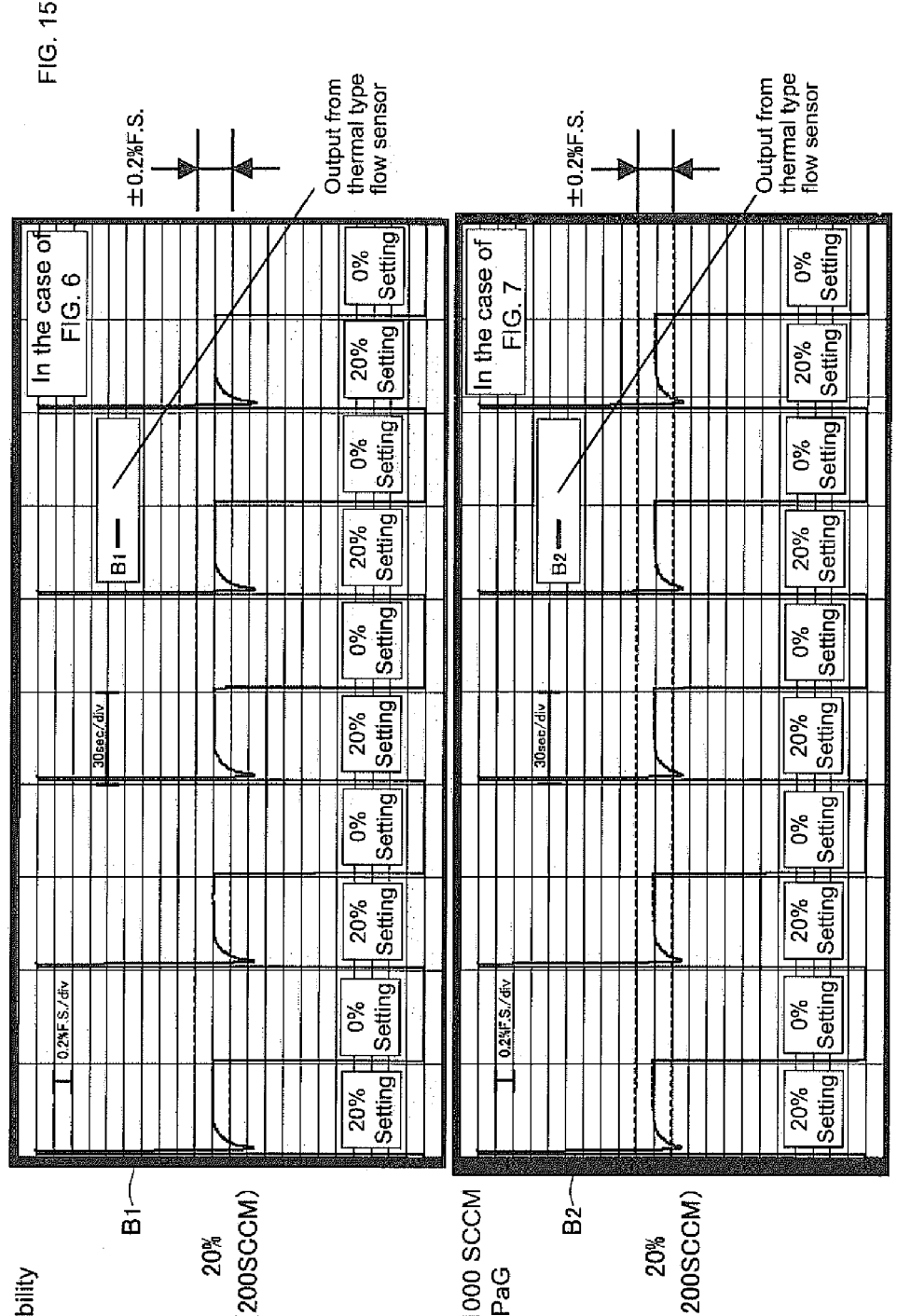
FIG. 15 shows curves of the repetitive reproducibility characteristics of the thermal type flow sensor (in the case of a set flow rate of 20%).

1: Pressure type flow control system with flow monitoring
$1a$: Pressure type flow control unit
$1b$: Thermal type flow monitoring unit
2: Thermal type flow sensor
$2b$: Sensor circuit
$2d$: Laminar flow element
$2e$: Sensor pipe
$2e'$: Flow passage between sensor pipe and laminar flow element
3: Control valve
$3a$: Valve drive unit
4: Temperature sensor
$4a$: Housing hole for temperature sensor
5: Pressure sensor
6: Orifice
7: Control unit
$7a$: Pressure type flow rate arithmetic and control unit
$7b$: Flow sensor control unit
$7a_1$: Input terminal
$7a_2$: Output terminal
$7b_1$: Input terminal
$7b_2$: Output terminal
8: Inlet side passage
9: Outlet side passage
10: Fluid passage in device main body
11: Gas supply source
12: Pressure regulator 13: Purge valve
14: Input side pressure sensor
15: Data logger
16: Vacuum pump
17: Pressure sensor
Pd: Control valve control signal
Pc: Flow rate signal
$A_1$: Flow rate setting input
$A_2$: Flow rate output from pressure type flow control system
$B_1$: Output from thermal type flow sensor (FIG. 6: In the case of thermal type flow sensor on the primary side)
$B_2$: Output from thermal type flow sensor (FIG. 7: In the case of thermal type flow sensor on the secondary side)
30: Body
30a: First main body block
30b: Second main body block
30c: Third main body block
30d: Fourth main body block
31: Fluid inlet
32: Fluid outlet
33: Connector
34: Fixation bolt
35: Fixation bolt
H: Monitoring flow rate output correction circuit
36: Input terminal for flow rate output $A_2$ from pressure type flow control unit
37: Input terminal for monitoring flow rate output $B_2$ from thermal type flow monitoring unit
38: Output terminal for corrected output $B_2'$ of monitoring flow rate
39: Input circuit
40: Differentiating circuit
41: Amplifying circuit
42: Shaping circuit
43: Correction circuit

What is claimed is:

1. A pressure type flow control system with flow monitoring comprising:
   (a) an inlet side passage for fluid;
   (b) a control valve comprising a pressure type flow control unit that is connected to a downstream side of the inlet side passage;
   (c) a thermal type flow sensor that is connected to a downstream side of the control valve;
   (d) an orifice that is installed on a fluid passage communicatively connected to a downstream side of the thermal type flow sensor;
   (e) a temperature sensor provided near the fluid passage between the control valve and the orifice;
   (f) a pressure sensor provided to determine pressure of the fluid passage between the control valve and the orifice;
   (g) an outlet side passage that is communicatively connected to the orifice; and
   (h) a first control unit comprising
      (i) a pressure type flow rate arithmetic and control unit to which a pressure signal from the pressure sensor and a temperature signal from the temperature sensor are input, and the pressure type flow rate arithmetic and control unit computes a flow rate value Q of a fluid flowing through the orifice, and outputs a control signal Pd to a valve drive unit that brings the control valve into an opening or closing action in a direction in which a difference between the computed flow rate value and a set flow rate value is decreased; and
      (ii) a flow sensor control unit to which a flow rate signal from the thermal type flow sensor is input, and the flow sensor control unit computes a first flow rate of the fluid flowing through the orifice according to the flow rate signal, to indicate an actual flow rate of the fluid flowing through the orifice,
   wherein the control valve, the thermal type flow sensor, the orifice, the pressure sensor, the temperature sensor, the inlet side passage, and the outlet side passage are integrally assembled in one body, and the fluid passage is integrally formed in the one body,
   wherein the one body is formed by integrally assembling a first main body block, a second main body block, a third main body block, and a fourth main body block so as to be integrally interconnected, and, respectively, the control valve is installed on a top surface side of the first main body block, a laminar flow element is installed on an internal left side surface of the third main body block, the orifice is installed on an internal right side surface of the third main body block, the pressure sensor is installed on a bottom surface side of the third main body block, and a sensor circuit of the thermal type flow sensor is installed on a top surface side of the third main body block, and a fluid passage communicatively connected to the respective first, second, third and fourth main body blocks is formed in the one body.

2. The pressure type flow control system with flow monitoring according to claim 1, wherein the pressure sensor is provided between an outlet side of the control valve and an inlet side of the thermal type flow sensor.

3. The pressure type flow control system with flow monitoring according to claim 1, wherein when a difference between the first flow rate of the fluid computed by the flow sensor control unit and the flow rate value Q of the fluid computed by the pressure type flow rate arithmetic and control unit exceeds a set value, then the first control unit performs an alarm indication.

4. A pressure type flow control system with flow monitoring comprising:
   (a) an inlet side passage for fluid;
   (b) a control valve comprising a pressure type flow control unit that is connected to a downstream side of the inlet side passage;
   (c) a thermal type flow sensor that is connected to a downstream side of the control valve;
   d)an orifice that is installed on a fluid passage communicatively connected to a downstream side of the thermal type flow sensor;
   (e) a temperature sensor provided near the fluid passage between the control valve and the orifice;
   (f) a pressure sensor provided to determine pressure of the fluid passage between the control valve and the orifice;
   (g) an outlet side passage that is communicatively connected to the orifice; and
   (h) a first control unit comprising
      (i) a pressure type flow rate arithmetic and control unit to which a pressure signal from the pressure sensor and a temperature signal from the temperature sensor are input, and the pressure type flow rate arithmetic and control unit computes a flow rate value Q of a fluid flowing through the orifice, and outputs a control signal Pd to a valve drive unit that brings the control valve into an opening or dosing action in a direction in which a difference between the computed flow rate value and a set flow rate value is decreased; and
      (ii) a flow sensor control unit to which a flow rate signal from the thermal type flow sensor is input, and the flow sensor control unit computes a first flow rate of the fluid flowing through the orifice according to the flow rate signal, to indicate an actual flow rate of the fluid flowing through the orifice, wherein the flow sensor control unit comprises a monitoring flow rate output correction circuit that corrects a monitoring flow rate $B_2$ computed on the basis of the flow rate signal from the thermal type flow sensor that is provided for the flow sensor control unit, and the monitoring flow rate output correction circuit corrects the monitoring flow rate $B_2$ to be $B_2'=B_2-C\cdot\Delta P/\Delta t$, wherein C is a conversion factor, by use of a gradient $\Delta P/\Delta t$ of fluid control pressure, and the monitoring flow rate output correction circuit outputs the corrected monitoring flow rate output $B_2'$ as a first monitoring flow rate.

5. The pressure type flow control system with flow monitoring according to claim 4, wherein the monitoring flow rate output correction circuit comprises a differentiating circuit that receives as input a controlled flow rate output $A_2$ from the pressure type flow control unit, an amplifying circuit that amplifies an output value from the differentiating circuit, a shaping circuit that shapes an output from the amplifying circuit, and a correction circuit that subtracts an input from the shaping circuit from the monitoring flow rate output $B_2$ from the thermal type flow monitoring unit in order to output the corrected monitoring flow rate output $B_2'$.

6. The pressure type flow control system with flow monitoring according to claim 2, wherein when a difference between the first flow rate of the fluid computed by the flow sensor control unit and the flow rate value Q of the fluid computed by the pressure type flow rate arithmetic and control unit exceeds a set value, then the first control unit performs an alarm indication.

* * * * *